US 9,471,957 B2

(12) United States Patent
Xin

(10) Patent No.: US 9,471,957 B2
(45) Date of Patent: Oct. 18, 2016

(54) METHOD FOR PARTITIONING, MANAGING AND DISPLAYING A COLLABORATION SPACE AND INTERACTIVE INPUT SYSTEM EMPLOYING SAME

(71) Applicant: SMART Technologies ULC, Calgary (CA)

(72) Inventor: Min Xin, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 72 days.

(21) Appl. No.: 14/579,944

(22) Filed: Dec. 22, 2014

(65) Prior Publication Data

US 2015/0279071 A1    Oct. 1, 2015

Related U.S. Application Data

(60) Provisional application No. 61/971,617, filed on Mar. 28, 2014.

(51) Int. Cl.
| | | |
|---|---|---|
| G06T 11/60 | (2006.01) | |
| G06T 1/60 | (2006.01) | |
| G06T 11/20 | (2006.01) | |
| G06T 9/40 | (2006.01) | |

(52) U.S. Cl.
CPC .. *G06T 1/60* (2013.01); *G06T 9/40* (2013.01)

(58) Field of Classification Search
CPC ..... G06T 17/20; G06T 17/205; G06T 15/04; G06T 11/40; G06T 15/005
See application file for complete search history.

(56) References Cited

U.S. PATENT DOCUMENTS

| | | |
|---|---|---|
| 5,448,263 A | 9/1995 | Martin |
| 6,141,000 A | 10/2000 | Martin |
| 6,337,681 B1 | 1/2002 | Martin |
| 6,747,636 B2 | 6/2004 | Martin |
| 6,803,906 B1 | 10/2004 | Morrison et al. |
| 6,999,061 B2 | 2/2006 | Hara et al. |
| 7,206,809 B2 | 4/2007 | Ludwig et al. |
| 7,232,986 B2 | 6/2007 | Worthington et al. |
| 7,236,162 B2 | 6/2007 | Morrison et al. |
| 7,274,356 B2 | 9/2007 | Ung et al. |
| 7,450,114 B2 | 11/2008 | Anwar |
| 7,532,206 B2 | 5/2009 | Morrison et al. |

(Continued)

FOREIGN PATENT DOCUMENTS

| | | |
|---|---|---|
| CA | 2481396 C | 3/2005 |
| WO | 2012/094738 A1 | 7/2012 |
| WO | 2012171110 A1 | 12/2012 |

OTHER PUBLICATIONS

Rekimoto, J. "A Multiple Device Approach for Supporting Whiteboard-based Interactions", Proceedings of the SIGCHI Conference on Human factors in computer systems CH198, Apr. 18-23, 1998, pp. 1-8.

(Continued)

*Primary Examiner* — Todd Buttram
(74) *Attorney, Agent, or Firm* — Parlee McLaws LLP (CGY); Sean Goodwin

(57) ABSTRACT

A computerized method of managing a collaboration space comprises partitioning the collaboration space into a plurality of tiles in a tree structure; and associating each graphic object with a tile in said tree structure; said tile being the smallest tile in the tree structure that substantially accommodate said graphic object.

15 Claims, 20 Drawing Sheets

(56) References Cited

U.S. PATENT DOCUMENTS

| | | |
|---|---|---|
| 7,707,503 B2 | 4/2010 | Good et al. |
| 2003/0234772 A1 | 12/2003 | Zhang et al. |
| 2005/0005241 A1 | 1/2005 | Hunleth et al. |
| 2005/0138570 A1 | 6/2005 | Good et al. |
| 2009/0317010 A1* | 12/2009 | Gerhard ............... H04N 19/162 382/240 |
| 2011/0258563 A1 | 10/2011 | Lincke |
| 2012/0144283 A1 | 6/2012 | Hill et al. |
| 2012/0154266 A1 | 6/2012 | Cho |
| 2012/0166446 A1* | 6/2012 | Bowman ........... G06F 17/30327 707/743 |
| 2012/0256949 A1* | 10/2012 | Treat ..................... G06F 9/4443 345/629 |
| 2013/0086487 A1 | 4/2013 | Findlay et al. |
| 2013/0198653 A1 | 8/2013 | Tse et al. |
| 2014/0350997 A1* | 11/2014 | Holm ............... G06Q 10/06316 705/7.26 |

OTHER PUBLICATIONS

PCT/CA2013/000014 International Search Report and Written Opinion.

* cited by examiner

METHOD FOR PARTITIONING, MANAGING AND DISPLAYING A COLLABORATION SPACE AND INTERACTIVE INPUT SYSTEM EMPLOYING SAME

CROSS-REFERENCE TO RELATED APPLICATIONS

This application claims the benefit of U.S. Provisional Patent Application Ser. No. 61/971,617, filed Mar. 28, 2014, the entirety of which is incorporated herein by reference.

FIELD OF THE DISCLOSURE

The present invention relates generally to collaboration, and in particular to a method of partitioning, managing and displaying a collaboration space and an interactive input system employing same.

BACKGROUND

Interactive input systems are known, allowing users to inject input (e.g., digital ink, mouse events etc.) into an application program using an active pointer (e.g., a pointer that emits light, sound, or other signal), a passive pointer (e.g., a finger, cylinder or other suitable object) or other suitable input devices such as a mouse or trackball, are known. Such interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206, all assigned to SMART Technologies ULC of Calgary, Alberta, Canada, assignee of the subject disclosure, the entire disclosures of which are incorporated herein by reference; touch systems comprising touch panels employing electromagnetic, capacitive, acoustic or other technologies to register pointer input; tablet; laptop computers; desktop computers; smartphones; personal digital assistants (PDAs) and other handheld devices; and other similar devices.

U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital imaging devices at its corners. The digital imaging devices have overlapping fields of view that encompass and look generally across the touch surface. The digital imaging devices acquire images looking across the touch surface from different vantages and generate image data. Image data acquired by the digital imaging devices is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, light injected into an optical waveguide at an appropriate angle is completely reflected between the opposite surfaces of the waveguide (so called the total internal reflection (TIR) of light). When an object such as a pointer touches the waveguide surface, the index of refraction of the media adjacent the waveguide about the touch point is changed (due to the media changing from air to the pointer). Consequently, the TIR of light is frustrated at the touch point, causing some light to escape from the touch point. In such a multi-touch interactive input system, the machine vision system captures images including the point(s) of escaped light, and processes the images to identify the touch position(s) on the waveguide surface based on the point(s) of escaped light for use as input(s) to application programs.

Interactive input systems may be used by a single user or a plurality of users to collaboratively work thereon. For example, an interactive input system may provide a collaboration space such as a digital canvas for users to inject thereon various graphic objects such as digital ink, lines, shapes, images, text, animation, graphic representations of sounds and other types of multimedia content, and the like. A user may adjust the display of the interactive input system to different zoom levels as desired to improve readability or comprehension of the information.

Zoomable user interfaces have been considered. For example, Internet-based "online" map applications such as Google Maps™ offered by Google Inc. of Mountain View, Calif., USA, provide zoomable user interfaces to allow users to adjust the displayed maps to various levels of detail as desired.

U.S. Patent Publication No. 2013/0198653 assigned to SMART Technologies ULC of Calgary, Alberta, Canada, assignee of the subject disclosure, the content of which is incorporated herein by reference in its entirety, discloses a method of displaying input during a collaboration session, comprising providing a canvas for receiving input from at least one participant using a computing device joined to the collaboration session; and displaying the canvas at one of a plurality of discrete zoom levels on a display associated with the computing device.

A collaboration space may comprise a large number of graphic objects. Managing and displaying the graphic objects may then impose a significant computational cost to the interactive system.

One solution for reducing the computational cost of managing and displaying graphic objects in a collaboration space is to partition the collaboration space into a plurality of fixed-size blocks or "tiles", and associate graphic objects with respective tiles based on the locations of the graphic objects. The content of each tile, including the graphic objects associated therewith, is stored separately, e.g., as a file.

For example, as shown in FIG. 1, a collaboration space 10 is partitioned in a known manner to a plurality of fixed-size, square tiles, each of which is associated with graphic objects whose geometry centers fall within. The content of each tile, including the graphic objects associated therewith, is stored as a file. For example, graphic object 16 is associated with tile 12 and stored in a first file, and graphic objects 18 to 28 are associated with tile 14 and stored in a second file.

When displaying the collaboration space, tiles comprising graphic objects that overlap with the viewport such as the display or a portion thereof, are determined and loaded to the memory of the interactive input system for rendering and display.

In the example of FIG. 1, a user (not shown) has zoomed-in the display of the collaboration space 10 such that the viewport 30 is to display a portion of the tile 12. The content of tile 12, including graphic object 16, is then loaded to the memory of the system for rendering and display. As graphic object 18 overlaps with the viewport 30, its associated tile, i.e., tile 14, is also loaded to the memory of the system for rendering and display. As a result, all graphic objects 18 to 28 associated with tile 14 are loaded. However, as graphic objects 20 to 28 do not overlap with the viewport 30, loading and processing them causes unnecessary computational cost to the system.

It is therefore an object to provide a novel method of partitioning, managing and displaying a collaboration space and an interactive input system employing the same.

SUMMARY

According to one aspect of this disclosure, there is provided a computerized method of managing a collaboration space having one or more graphic objects therein, the method comprising: partitioning the collaboration space into a plurality of tiles distributed at a plurality of levels in a tree structure representing a recursive subdivision of the collaboration space, the union of tiles at each level spanning the collaboration space, each tile at a level either being a leaf node or being subdivided into a plurality of smaller tiles at the next level; and for each graphic object, determining an object tile in said tree structure for said graphic object; said object tile being the smallest tile in the tree structure that accommodates at least a predefined major portion of said graphic object; and associating said graphic object with the determined object tile.

In some embodiments, each tile at the same level has the same size.

In some embodiments, the tree structure may be a Quad-Tree, in which each tile at a level either is a leaf node or is subdivided into four smaller tiles at the next level.

In some embodiments, the object tile is the smallest tile in the tree structure that accommodates the entirety of said graphic object.

In some embodiments, determining an object tile in said tree structure for said graphic object further comprises: determining a tile level L in the tree structure such that the size of each tile at said tile level L is larger than that of at least a predefined portion of said graphic object; and determining the object tile as a tile at said tile level that overlaps with at least the predefined major portion of said graphic object. Hereinafter, the term "size" refers to areal size.

To determine the tile level L, in some embodiments, a comparison can be made between a tile at a tile level and the graphic object to determine if the tile size is larger than that of at least a predefined major portion of the graphic object. In some alternative embodiments, a comparison can be made between a tile at a tile level and a bounding region of the graphic object to determine if the tile size is larger than that of at least a predefined major portion of the bounding region of the graphic object. Here, a bounding region is a shape enclosing the graphic object. Generally, such a bounding region has a simplified profile for simplifying calculation. Depending on the implementation, the bounding region may be a circle, a rectangle, an oval or other suitable shapes.

For example, in some embodiments, the tile level L is determined as the tile level of the smallest tile that the width thereof is larger than or equal to the diameter of a bounding circle of the graphic object weighted by a weighting factor $C_d$. The tile in the tile level L for said graphic object is determined by determining a tile in the tile level L that overlaps with the center of a bounding circle of said graphic object.

In some embodiments, the first weighting factor $C_d$ is one (1).

In some embodiments, the tiles are square tiles, and the tile level L is determined by iterating through the tree structure from the level having largest tile width to the level having the smallest tile width, to determine the tile level L having the largest tile width $W_L$ that satisfies $R > C_w W_L$, where R is the radius of the bounding circle of the graphic object, $C_w$ is a weighting factor, and $C_d = 1/(4C_w)$. In some embodiments, the weighting factor $C_w$ is 0.25.

In some embodiments, the tile level L is determined without iterating through the tree structure, by first calculating a suitable tile level $L_T$ and then calculates the index of the tile at level $L_T$ for associating with the graphic object.

In some embodiments, at least the object tiles, i.e., tiles that have at least one graphic object associated therewith, are stored in a first memory area, wherein each object tile is stored therein as a separate record that may be independently accessed. In some embodiments, the first memory area may be memory for long-term storage of data, such as hard drive(s), solid-state drives, flash drives, or the like. In some other embodiments, the first memory area may be a cache memory area.

In some embodiments, the linkages of the object tiles are also stored.

In some embodiments, the empty-but-intermediate tiles that have no graphic object associated therewith but are linked intermediate between a root tile and an object tile, are also stored in the first memory area.

In some embodiments, the above computerized method further comprises: determining the position of a viewport, said viewport displaying a display image of at least a portion of said collaboration space; determining a set of tiles in said tree structure required for rendering a display image to be displayed in said viewport; and loading the determined set of tiles from the first memory area to a second memory area.

In some embodiments, the second memory area may be the memory area for temporarily storing data used during the collaboration, e.g., a Random Access Memory (RAM) area. The second memory area may be local to the first memory area, e.g., both physically integrated in the same computing device. The first and second memory areas may be different storage media and/or managed by different function modules or controllers of the computing device. Alternatively, the first and second memory areas may be the same storage media managed by the same function module or controller of the computing device. In other words, the first and second memory areas may be two portions of the same storage.

In some alternative embodiments, the second memory area may be remote to the first memory area, e.g., the second memory area being physically integrated in a computing device while the first memory area being a removable hard drive functionally connected to the computing device.

In some other embodiments, the second memory area may be a memory area on another computing device, and therefore is remote to the first memory area. In these embodiments, a first computing device stores the collaboration space and the graphic objects therein in a first memory area as described above, wherein the first area is in the first computing device. Under the request of a second computing device, the first computing device loads a set of tiles determined as described above to a second memory area in the second computing device via a wired or wireless communication channel.

In some embodiments, the aforementioned determination of a set of tiles comprises: for each tile in the tree structure: defining a zone for said tile as an area concentric with said tile with a dimension equal to that of said tile weighted by a weighting factor $C_b$; determining if the view port overlaps with said zone; and marking the tile as a required tile of said set of tiles if the view port overlaps with said zone. In some embodiments, the weighting factor $C_b$ is 2.

According to another aspect of this disclosure, there is provided an interactive input system for managing a collaboration space having one or more graphic objects, comprising: a processing structure; a memory functionally coupled to said processing structure and storing at least a portion of said collaboration space; wherein said processing structure executes computer-executable code for: partitioning the collaboration space into a plurality of tiles distributed at a plurality of levels in a tree structure representing a recursive subdivision of the collaboration space, the union of tiles at each level spanning the collaboration space, each tile at a level either being a leaf node or being subdivided into a plurality of smaller tiles at the next level; and associating each graphic object with an object tile in said tree structure, said object tile being the smallest tile in the tree structure that accommodates at least a predefined major portion of said graphic object.

In some embodiments, each tile at the same level having the same size.

In some embodiments, the tree structure may be a Quad-Tree, in which each tile at a level either is a leaf node or is subdivided into four (4) smaller tiles at the next level.

In some embodiments, said object tile is the smallest tile in the tree structure that accommodates the entirety of said graphic object.

In some embodiments, said computer-executable code for associating each graphic object with an object tile in said tree structure further comprises computer-executable code for: for each graphic object, determining a tile level L in the tree structure such that the size of each tile at said level L is larger than that of at least the predefined major portion of said graphic object; determining an object tile at said tile level L that overlaps with at least the predefined major portion of said graphic object; and associating said graphic object with said object tile.

In some embodiments, said tile level L is determined as the tile level of the smallest tile that the width thereof is larger than or equal to the diameter of a bounding circle of the graphic object weighted by a weighting factor $C_d$.

In some embodiments, said tiles are square tiles, and said computer-executable code for determining a tile level L comprises computer-executable code for: iterating from the level having largest tile width to the level having the smallest tile width, to determine the tile level L having the largest tile width $W_L$ that satisfies $R > C_w W_L$, where R is the radius of the bounding circle of the graphic object, $C_w$ is a weighting factor, and $C_d = 1/(4C_w)$.

In some embodiments, said weighting factor $C_w$ is 0.25.

In some embodiments, said computer-executable code for determining an object tile in said tile level that overlaps with at least the major portion of said graphic object comprises computer-executable code for: determining an object tile in said tile level that overlaps with the center of a bounding circle of said graphic object.

In some embodiments, the processing structure of the aforementioned interactive input system further executes computer-executable code for: storing, in a first memory area, at least the object tiles, wherein each object tile is stored therein as a separate record that may be independently accessed.

In some embodiments, said processing structure further executes computer-executable code for: storing, in said first memory area, the linkages of the object tiles.

In some embodiments, said processing structure further executes computer-executable code for: storing, in said first memory area, the empty-but-intermediate tiles that have no graphic object associated therewith but are linked intermediate between a root tile and an object tile.

In some embodiments, the processing structure of the aforementioned interactive input system further executes computer-executable code for: determining the position of a viewport, said viewport displaying a display image of at least a portion of said collaboration space; determining a set of tiles in said tree structure required for rendering a display image to be displayed in said viewport; and loading the determined set of tiles from the first memory area to a second memory area.

In some embodiments, said first memory area is local to said second memory area.

In some embodiments, said first memory area is remote to said second memory area.

In some embodiments, the computer-executable code for determining a set of tiles comprises computer-executable code for: for each tile in the tree structure: defining a zone for said tile as an area concentric with said tile with a dimension equal to that of said tile weighted by a weighting factor $C_b$; determining if the view port overlaps with said zone; and marking the tile as a required tile of said set of tiles if the view port overlaps with said zone. In some embodiments, the weighting factor $C_b$ is 2.

According to another aspect of this disclosure, there is provided a computer-readable storage device comprising computer-executable instructions for managing a collaboration space having one or more graphic objects, wherein the instructions, when executed, cause a processor to perform actions comprising: partitioning the collaboration space into a plurality of tiles distributed at a plurality of levels in a tree structure representing a recursive subdivision of the collaboration space, the union of tiles at each level spanning the collaboration space, each tile at a level either being a leaf node or being subdivided into a plurality of smaller tiles at the next level; and associating each graphic object with an object tile in said tree structure; said object tile being the smallest tile in the tree structure that substantially accommodate said graphic object.

In some embodiments, each tile at the same level having the same size.

In some embodiments, the tree structure may be a Quad-Tree, in which each tile at a level either is a leaf node or is subdivided into four (4) smaller tiles at the next level.

In some embodiments, said object tile is the smallest tile in the tree structure that accommodates the entirety of said graphic object.

In some embodiments, associating each graphic object with an object tile in said tree structure further comprises: for each graphic object, determining a tile level L in the tree structure such that the size of each tile at said level L is larger than that of at least a predefined major portion of said graphic object; determining an object tile at said tile level L that overlaps with at least the predefined major portion of said graphic object; and associating said graphic object with said object tile.

In some embodiments, said tile level L is determined as the tile level of the smallest tile that the width thereof is larger than or equal to the diameter of a bounding circle of the graphic object weighted by a weighting factor $C_d$.

In some embodiments, said tiles are square tiles, and determining a tile level L comprises: iterating from the level having largest tile width to the level having the smallest tile width, to determine the tile level L having the largest tile width $W_L$ that satisfies $R > C_w W_L$, where R is the radius of the bounding circle of the graphic object, $C_w$ is a weighting factor, and $C_d = 1/(4C_w)$.

In some embodiments, said weighting factor $C_w$ is 0.25.

In some embodiments, determining an object tile at said tile level that overlaps with at least the predefined major portion of said graphic object comprises: determining the object tile as a tile at said tile level that overlaps with at least the predefined major portion of said graphic object.

In some embodiments, the instructions, when executed, further cause the processor to perform actions comprising: storing, in a first memory area, at least the object tiles, wherein each object tile is stored therein as a separate record that may be independently accessed.

In some embodiments, said instructions, when executed, further cause the processor to perform actions comprising: storing, in said first memory area, the linkages of object tiles.

In some embodiments, said instructions, when executed, further cause the processor to perform actions comprising: storing, in said first memory area, the empty-but-intermediate tiles that have no graphic object associated therewith but are linked intermediate between a root tile and an object tile.

In some embodiments, the instructions, when executed, further cause the processor to perform actions comprising: determining the position of a viewport, said viewport displaying a display image of at least a portion of said collaboration space; determining a set of tiles in said tree structure required for rendering a display image to be displayed in said viewport; and loading the determined set of tiles from the first memory area to a second memory area.

In some embodiments, said first memory area is local to said second memory area.

In some embodiments, said first memory area is remote to said second memory area.

In some embodiments, the instructions, when executed, further cause the processor to perform actions comprising: for each tile in the tree structure: defining a zone for said tile as an area concentric with said tile with a dimension equal to that of said tile weighted by a weighting factor $C_b$; determining if the view port overlaps with said zone; and marking the tile as a required tile of said set of tiles if the view port overlaps with said zone.

In some embodiments, the weighting factor $C_b$ is 2.

According to another aspect of this disclosure, there is provided a method of controlling one or more memory devices for storing a collaboration space, said collaboration space having one or more graphic objects therein, the method comprising: partitioning the collaboration space into a plurality of tiles distributed at a plurality of levels in a tree structure representing a recursive subdivision of the collaboration space, the union of tiles at each level spanning the collaboration space, each tile at a level either being a leaf node or being subdivided into a plurality of smaller tiles in the next level; associating each graphic object with an object tile in said tree structure, said object tile being the smallest tile in the tree structure that substantially accommodates said graphic object; and storing at least the object tiles in said memory device, wherein each object tile is stored in at least one of said memory devices as a separate record that may be independently accessed.

In some embodiments, each tile at the same level having the same size.

In some embodiments, the tree structure may be a Quad-Tree, in which each tile at a level either is a leaf node or is subdivided into four (4) smaller tiles at the next level.

In some embodiments, the method further comprising: for each graphic object: determining a tile level L in the tree structure such that the size of each tile at said level L is larger than that of at least a predefined major portion of said graphic object; and determining the object tile as a tile at said tile level that overlaps with at least the predefined major portion of said graphic object.

In some embodiments, said tile level L is determined as the tile level of the smallest tiles that the width thereof is larger than or equal to the diameter of a bounding circle of the graphic object, weighted by a weighting factor $C_d$.

In some embodiments, said tiles are square tiles, and said determining a tile level L comprises: iterating from the level having largest tile width to the level having the smallest tile width, to determine the tile level L having the largest tile width $W_L$ that satisfies $R > C_w W_L$, where R is the radius of the bounding circle of the graphic object, $C_w$ is a weighting factor, and $C_d = 1/(4C_w)$.

In some embodiments, said weighting factor $C_w$ is 0.25.

In some embodiments, determining an object tile at said tile level that overlaps with at least the predefined major portion of said graphic object comprises: determining the object tile as a tile at said tile level that overlaps with the center of a bounding circle of said graphic object.

In some embodiments, the aforementioned method of controlling a memory device further comprising: storing, in said memory device, the linkages of object tiles.

In some embodiments, the aforementioned method of controlling a memory device further comprising: storing, in said first memory area, the empty-but-intermediate tiles that have no graphic object associated therewith but are linked intermediate between a root tile and an object tile.

In some embodiments, the aforementioned method of controlling a memory device further comprises: determining the position of a viewport, said viewport displaying a display image of at least a portion of said collaboration space; determining a set of tiles in said tree structure required for rendering a display image to be displayed in said viewport; and reading out the determined set of tiles from said memory device.

In some embodiments, said viewport is local to said memory device.

In some embodiments, said viewport is remote to said memory device.

In some embodiments, determining a set of tiles comprises: for each tile in the tree structure: defining a zone for said tile as an area concentric with said tile with a dimension equal to that of said tile weighted by a weighting factor $C_b$; determining if the view port overlaps with said zone; and marking the tile as a required tile of said set of tiles if the view port overlaps with said zone.

In some embodiments, the weighting factor $C_b$ is 2.

According to another aspect of this disclosure, there is provided a method of controlling a memory device to read out at least a portion of data stored therein for generating an image to be displayed on a view port, said data being stored in said memory device as independently accessible records, each record representing a tile of a collaboration space having one or more graphic objects, said collaboration space being partitioned into a plurality of tiles distributed at a plurality of levels in a tree structure representing a recursive subdivision of the collaboration space, the union of tiles at each level spanning the collaboration space, each tile at a level either being a leaf node or being subdivided into a plurality of smaller tiles in the next level, and each graphic object in said collaboration space being associated with an object tile in said tree structure that is the smallest tile in the tree structure that substantially accommodates said graphic object, said method comprising: obtaining the linkages of the tree structure; determining the position of the viewport, said viewport displaying a display image of at least a portion of said collaboration space; determining a set of tiles in said tree structure required for rendering a display image to be displayed in said viewport; and reading out, from said memory device, the records representing the determined set of tiles; wherein determining a set of tiles comprises: for each tile in the tree structure: defining a zone for said tile as an area concentric with said tile with a dimension equal to that of said tile weighted by a weighting factor $C_b$; determining if the view port overlaps with said zone; and marking the tile as a required tile of said set of tiles if the view port overlaps with said zone.

In some embodiments, each tile at the same level having the same size.

In some embodiments, each tile at a level either is a leaf node or is subdivided into four smaller tiles at the next level.

In some embodiments, said second weighting factor $C_b$ is 2.

DETAILED DESCRIPTION

Figure 1:
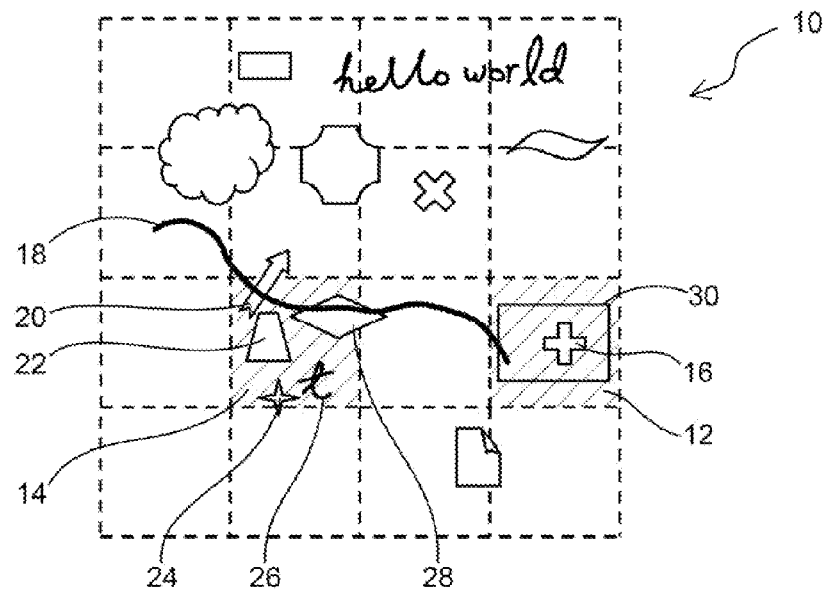
FIG. 1 illustrates the partitioning of a collaboration space, in accordance with a known method.
Figure 2:
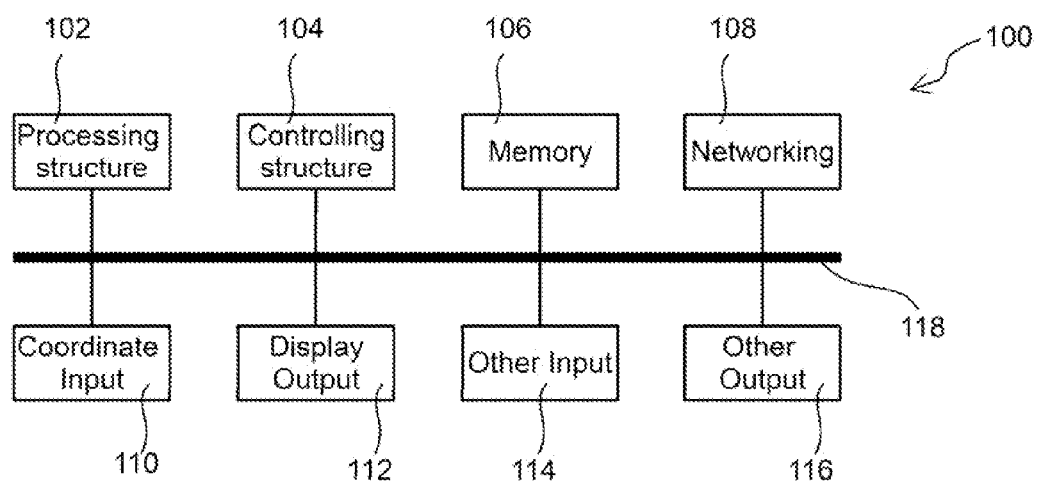
FIG. 2 is a simplified block diagram of the hardware structure of an interactive input system, according to an embodiment of the present disclosure.

Turning now to FIG. 2, an interactive input system is shown and is generally identified by reference numeral 100. In this embodiment, the interactive input system is a computing system suitable for processing a collaboration space, such as an interactive whiteboard, a tablet, a laptop computer, a desktop computer, a smartphone, a PDA, or the like. Herein, methods for effective management of such collaboration spaces are described. As follows, the system supporting the process and operation of such collaboration space are set forth before the embodiments for managing same are described.

The interactive input system 100 comprises a processing structure 102, a controlling structure 104, memory or storage 106, a networking structure 108, coordinate input 110, display output 112, and other input and output modules 114 and 116, all functionally interconnected by a communication channel 118.

The processing structure 102 may be one or more single-core or multiple-core computing processors such as Intel® microprocessors offered by Intel Corporation of Santa Clara, Calif., USA, AMD® microprocessors offered by Advanced Micro Devices of Sunnyvale, Calif., USA, ARM® microprocessors manufactured by a variety of manufactures under the ARM® architecture developed by ARM Ltd. of Cambridge, UK, or the like.

The controlling structure 104 comprises a plurality of controllers, such as graphic controllers, input/output chipsets and the like, for coordinating operations of various hardware components and modules of the interactive input system 100.

The memory 106 comprises a plurality of storage units accessible by the processing structure 102 and the controlling structure 104 for reading and/or storing data, including input data and data generated by the processing structure 102 and the controlling structure 104. The memory 106 may be volatile and/or non-volatile, non-removable or removable storage media such as RAM, ROM, EEPROM, solid-state memory, hard disks, CD, DVD, flash memory, or the like. In use, the memory 106 is generally divided to a plurality of portions or areas for different use purposes. For example, a portion of the memory 106 may be used for long-term data storing, e.g., storing files or databases; another portion of the memory 106 may be used for caching data that is not currently used by the processing structure 102 and/or the controlling structure 104, e.g., a so-called "virtual memory"; yet another portion of the memory 106 may be used as the system memory for temporarily storing data generated or used during processing.

In various embodiments, the memory 106 may comprise a mixture of different types of storage media, or may consist of the same type of storage medium. Moreover, different portions of the memory 106 may be local to each other. Alternatively, some portions of the memory 106 may be remote to other portions thereof. For example, some portions of the memory 106 may be the storage media on the "cloud" that can be accessed via a network, e.g., Internet.

The networking structure 108 comprises one or more networking modules for connecting to other computing devices, memory 106, and/or networks via wired or wireless connections such as Ethernet, wireless phone channels, WiFi®, Bluetooth®, ZigBee®, or the like. In some embodiments, parallel ports, serial ports, USB connections may also be used for connecting other computing devices or networks although they are usually considered as input/output interfaces for connecting input/output devices.

The display output 112 comprises one or more display modules for displaying images, such as monitors, LCD displays, LED displays, projectors, and the like. The display output 112 may be a physically integrated part of the interactive input system 100 (e.g., the display of a laptop computer or tablet), or may be a display device physically separated from, but functionally coupled to, other components of the interactive input system 100 (e.g., the monitor of a desktop computer).

The coordinate input 110 comprises one or more input modules for one or more users to input coordinate data such as touch-sensitive screen, touch-sensitive whiteboard, trackball, computer mouse, touch-pad, or other human interface devices (HID) and the like. The coordinate input 110 may be a physically integrated part of the interactive input system 100 (e.g., the touch-pad of a laptop computer or the touch-sensitive screen of a tablet), or may be a display device physically separated from, but functionally coupled to, other components of the interactive input system 100 (e.g., a computer mouse). The coordinate input 100, in some implementation, may be integrated with the display output 112 to form a touch-sensitive screen or touch-sensitive whiteboard.

The interactive input system 100 may also comprise other input 114 such as a keyboard, a microphone, a scanner and the like. The interactive input system may further comprise other output 116 such as a speaker, a printer, and the like.

The communication channel 118 interconnects various components 102 to 116 enabling them to transmit and receive data and control signals to/from each other. In this embodiment, the communication channel 118 is a system bus.

Figure 3:
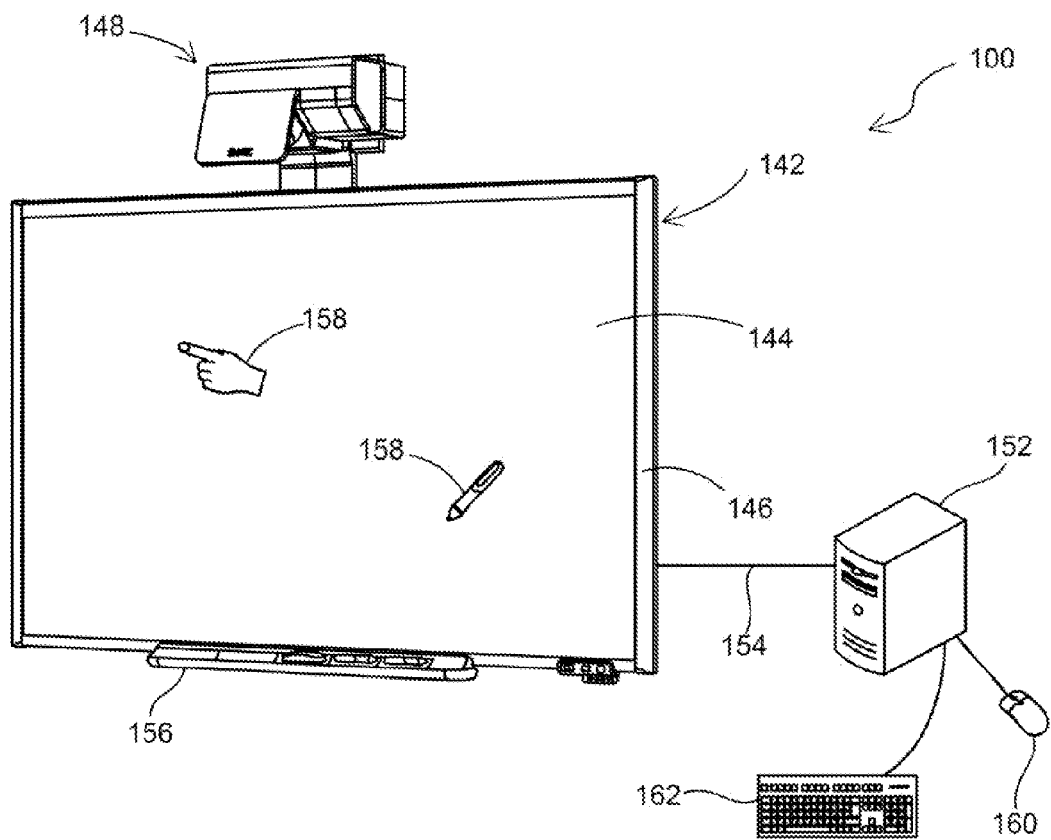
FIG. 3 is a perspective view of an example of the interactive input system of FIG. 2.

FIG. 3 shows an example of the interactive input system 100, which allows one or more users to inject input such as digital ink, mouse events, commands, etc., into an executing application program, by using one or more pointers 158 such fingers, palms, fists, pen tools, erasers, cylinders or other suitable objects. As shown, the interactive input system 100 comprises a two-dimensional (2D) interactive device in the form of an interactive whiteboard (IWB) 142 mounted on a vertical support surface such as a wall surface or the like. The IWB 142 displays a collaboration space within which graphic objects are created, displayed and managed.

The IWB 142 comprises a generally planar, rectangular interactive surface 144 that is surrounded about its periphery by a bezel 146. An ultra-short-throw projector 148, such as that sold by SMART Technologies ULC of Calgary, Alberta, Canada, under the name "SMART UX60", is also mounted on the support surface above the IWB 142 and projects an image, for example, a computer desktop, onto the interactive surface 144.

The IWB 142 employs machine vision to detect one or more pointers brought into a region of interest in proximity with the interactive surface 144. The IWB 142 communicates with a general purpose computing device 152 via a universal serial bus (USB) cable 154 or other suitable wired or wireless communication link. The general purpose computing device 152 executes one or more application programs to process the output of the IWB 142 and adjusts image data that is output to the projector 148, if required, so that the image presented on the interactive surface 144 reflects pointer activity. In this manner, the IWB 142, general purpose computing device 152 and projector 148 allow pointer activity proximate to the interactive surface 144 to be recorded as writing or drawing or used to control execution of one or more application programs executed by the general purpose computing device 152.

The bezel 146 is mechanically fastened to the interactive surface 144 and comprises four bezel segments that extend along the edges of the interactive surface 144. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 144.

A tool tray 156 is affixed to the IWB 142 adjacent the bottom bezel segment using suitable fasteners such as for example, screws, clips, adhesive, etc. As can be seen, the tool tray 156 comprises a housing having an upper surface configured to define a plurality of receptacles or slots. The receptacles are sized to receive one or more pen tools as well as an eraser tool that can be used to interact with the interactive surface 144. Control buttons (not shown) are also provided on the upper surface of the tool tray housing to enable a user to control operation of the interactive input system 100.

Imaging assemblies (not shown) are accommodated by the bezel 146, with each imaging assembly being positioned adjacent a different corner of the bezel. Each of the imaging assemblies comprises an image sensor and associated lens assembly that provides the image sensor with a field of view sufficiently large as to encompass the entire interactive surface 144. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 144 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes IR illumination and appears as a dark region interrupting the bright band in captured image frames.

The imaging assemblies are oriented so that their fields of view overlap and look generally across the entire interactive surface 144. In this manner, any pointer brought into proximity of the interactive surface 144 appears in the fields of view of the imaging assemblies and thus, is captured in image frames acquired by multiple imaging assemblies. When the imaging assemblies acquire image frames in which a pointer exists, the imaging assemblies convey pointer data to the general purpose computing device 152.

The general purpose computing device 152 in this embodiment is a personal computer or other suitable processing device comprising, for example, a processing unit being the processing structure 102 of FIG. 2, system memory (volatile and/or non-volatile memory) and other non-removable or removable memory (e.g., a hard disk drive, RAM, ROM, EEPROM, CD-ROM, DVD, solid-state memory, flash memory, etc.) forming the memory 106 of FIG. 2, and a system bus, being the communication channel 118 of FIG. 2, coupling the various computer components to the processing unit. The general purpose computing device 152 may also comprise networking capabilities using Ethernet, WiFi®, and/or other suitable network format, to enable connection to shared or remote drives, one or more networked computers, and/or other networked devices. A mouse 160 and a keyboard 162 are coupled to the general purpose computing device 152.

The general purpose computing device 152 processes pointer data received from the imaging assemblies to resolve pointer ambiguity by combining the pointer data generated by the imaging assemblies, and to compute the locations of pointers proximate the interactive surface 144 using well known triangulation. The computed pointer locations are then recorded as writing or drawing or used an input command to control execution of an application program as described above.

In addition to computing the locations of pointers proximate to the interactive surface 144, the general purpose computing device 152 also determines the pointer types (e.g., pen tool, finger or palm) by using pointer type data received from the IWB 142. The pointer type data is generated for each pointer contact by the DSP of at least one of the imaging assemblies by differentiating a curve of growth derived from a horizontal intensity profile of pixels corresponding to each pointer tip in captured image frames. Specifics of methods used to determine pointer type are disclosed in U.S. Pat. No. 7,532,206 to Morrison, et al., and assigned to SMART Technologies ULC, the content of which is incorporated herein by reference in its entirety.

Figure 4:
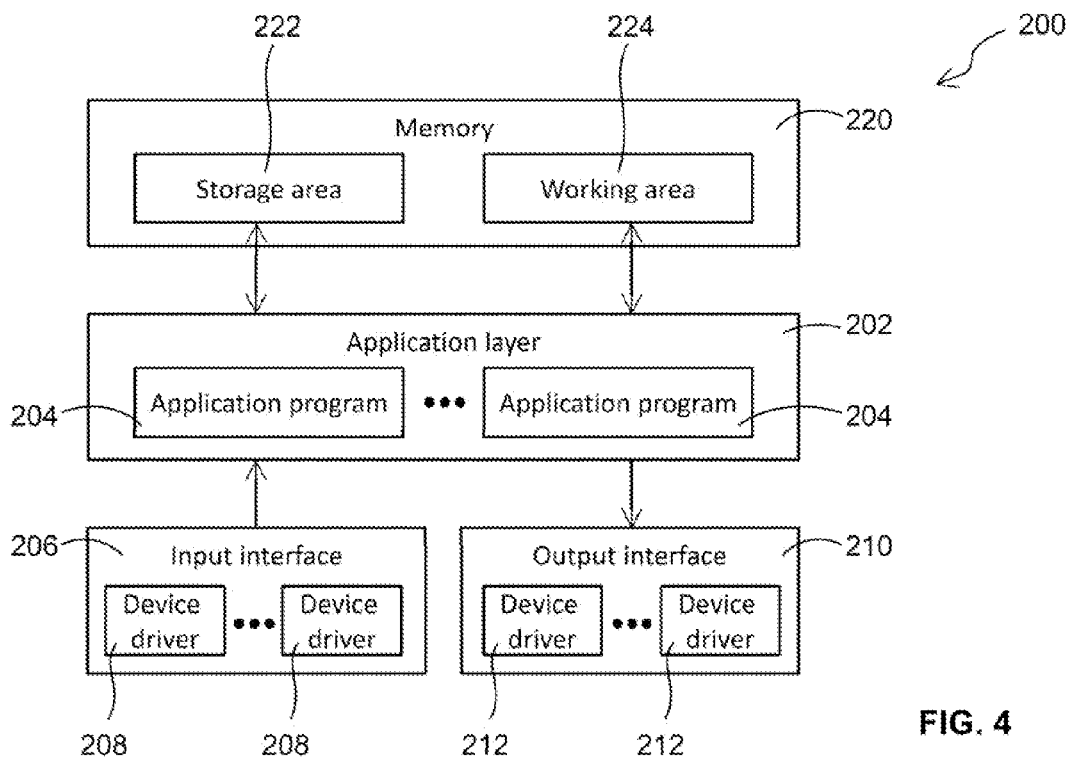
FIG. 4 is a simplified block diagram of the software architecture of the interactive input system of FIG. 2.

FIG. 4 shows the software architecture 200 of the interactive input system 100. The software architecture 200 comprises an application layer 202, an input interface 206, an output interface 210 and a logical memory 220. The application layer 202 comprises one or more application programs 204 executed or run by the processing structure 102 for performing various tasks. The input interface 206 comprises one or more input device drivers 208 for communicating with respective input devices including the coordinate input 110, and the output interface 210 comprises one or more output device drivers 212 for communicating with respective output devices including the display output 112. Input data received from the input devices via the input interface 206 is sent to the application layer 202, and is processed by one or more application programs 204. The output generated by the application programs 204 is sent to respective output devices via the output interface 210.

The logical memory 220 is a logical mapping of the physical memory 106 for facilitating the application programs to access. In this embodiment, the logical memory 220 comprises a storage area 222 that is usually mapped to non-volatile physical memory, such as hard disks, solid state disks, flash drives and the like, for generally long-term storing data therein. The storage area 222 may alternatively be a portion of physical memory 106 for caching data that is not currently used by the processing structure 102 and/or the controlling structure 104, e.g., a "virtual memory".

The logical memory 220 also comprises a working area 224 that is generally mapped to high-speed, and in some implementations volatile, physical memory, such as RAM, for application programs 204 to generally temporarily store data during program execution. For example, an application program 204 may load data from the storage area 222 into the working area 224, i.e., read out data from the storage area 222 and write it into the working area 224. The application program 204 may also store data generated during its execution in the working area 224. The application program 204 may further store some data to the storage area 222 as required or in response to a user's command.

In some embodiments, the working area 224 may be local to the storage area 222, e.g., both physically integrated in the same computing device. The storage area 222 and the working area 224 may be different storage media and/or managed by different function modules or controllers of the computing device. Alternatively, the storage area 222 and the working area 224 may be the same storage medium managed by the same function module or controller of the computing device. In other words, the storage area 222 and the working area 224 may be two portions of the same storage medium.

In some alternative embodiments, the working area 224 may be remote to the storage area 222, e.g., the working area 224 being physically integrated in a computing device while the storage area 222 being a removable hard drive functionally connected to the computing device.

In some other embodiments, the working area 224 may be a memory area on another computing device, and therefore is remote to the storage area 222. In these embodiments, a first computing device stores the collaboration space and the graphic objects therein in a storage area 222 as described above, wherein the storage area 222 is in the first computing device. Under the request of a second computing device, the first computing device loads a set of tiles determined as described above to a working area 224 in the second computing device via a wired or wireless communication channel.

Although not shown in FIG. 4, the software structure 200 of the interactive input system 100 also comprises an operating system, such as Microsoft® Windows™, Apple® OS X®, Apple® iOS®, Linux®, etc., which manages various hardware components of the interactive system 100, and provides support to application programs 206.

In this embodiment, the interactive input system 100 executes the processor-readable code of an application program 204, e.g., SMART Meeting Pro™ offered by SMART Technologies ULC of Calgary, Alberta, Canada, to manage a collaboration space. The application program, when running, creates a collaboration session, and creates or loads a collaboration space. Users may join the collaboration session and initiate user input to manipulate the collaboration space and graphic objects therein. In response to user input, the application program manipulates the collaboration space and the graphic objects therein. Here, the collaboration space is a digital space for accommodating graphic objects. As those skilled in the art appreciate, graphic objects are arranged on a (x, y) plane of the collaboration space with respective z-order such that a graphic object having a larger z-order value appears above another graphic object having a smaller z-order.

Having set forth the environment for the creation, display and interaction with such graphic objects, one turns to the management thereof.

Figure 5:
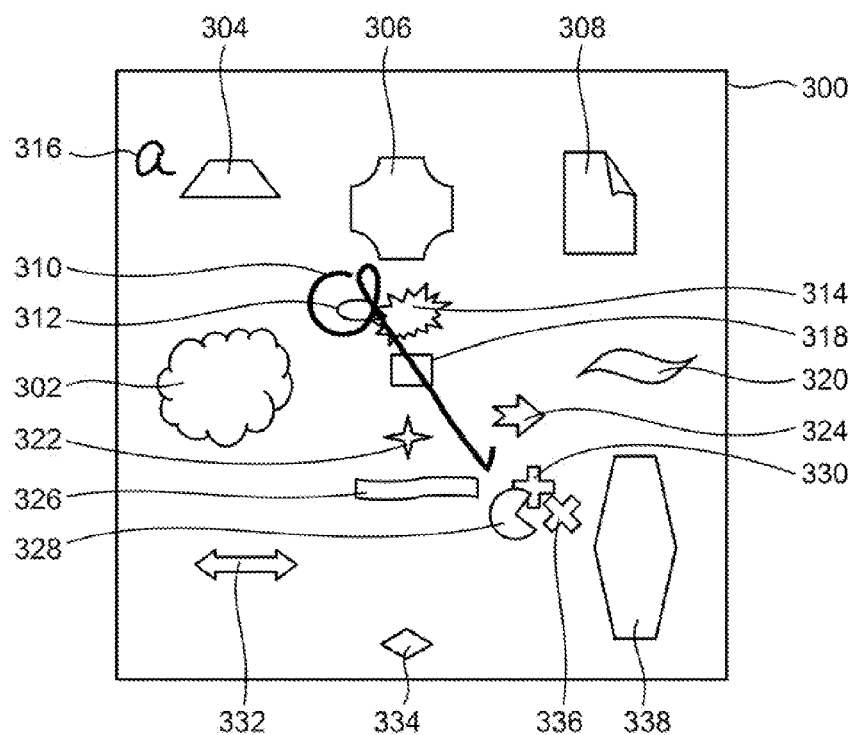
FIG. 5 illustrates an example of a collaboration space having graphic objects therein, managed by the interactive input system of FIG. 2.

FIG. 5 shows an example of a collaboration space 300 having a plurality of graphic objects 302 to 338 associated therewith. Generally, such a collaboration space 300 is stored in the storage area 222 for long-term storage, or as cached data, while only a portion of the collaboration space 300, e.g., a portion of the collaboration space 300 being to be displayed on a viewport, is loaded to the working area 224 for processing. Such a data-loading process in existing interactive input systems usually requires loading of many graphic objects unrequired for rendering the display image of the viewport, causing wasted loading time and storage occupancy of the working area 224, which generally deteriorates the performance of interactive input system, for example with slow response and/or with insufficient memory resources.

The interactive input system disclosed herein achieves improved performance by controlling the physical memory 106 using the method disclosed herein. In particular, the method disclosed herein partitions the collaboration space into tiles in a tree structure, associates each graphic object to a tile, and separately stores each tile and the graphic objects associated therewith in the storage area 222 such that, when displaying a portion of the collaboration space in a view port, the system can efficiently load required tiles and the graphic objects associated therewith into the working area 224. The interactive input system disclosed herein therefore achieves improved performance comparing to existing systems due to less wasted time and storage resource.

Starting from the entire collaboration space 300, the application program 204 iteratively partitions the collaboration space 300 into tiles of a predefined number of levels using a Quad-Tree algorithm, and associates graphic objects in the collaboration space with respective tiles (described in more detail later). For ease of description, the collaboration space 300 in this example is a square space with a width of 80 pixels.

Here, a Quad-Tree is a tree data structure having nodes appropriate for storing information to be retrieved on composite keys, in which each node may comprise zero (0) children nodes (so called a "leaf node" or a "leaf tile") or four (4) children nodes. Quad-Trees are often used for iteratively partitioning a two-dimensional space into four quadrants or regions. Many Quad-Tree algorithms may be used in the method and system disclosed herein. More information of Quad-Tree algorithm may be found in the academic paper entitled "Quad Trees: A Data Structure for Retrieval on Composite Keys" by Raphael Finkel and J. L. Bentley, and published in 1974 on Acta Informatica, Volume 4, Issue 1, pp. 1-9, the content of which is incorporated herein by reference in its entirety.

In this embodiment, a collaboration space is partitioned using a suitable Quad-Tree algorithm into a plurality of tiles at K levels, K>1, of which each tile corresponds to a node in the Quad-Tree structure representing a recursive subdivision of the collaboration space. In other words, the collaboration space has K representations corresponding to the K levels of the Quad-Tree. In each representation, the collaboration space is represented by the tiles in the corresponding level, i.e., the union of tiles at each level span the collaboration space. Tiles in each level have the same size. A tile at each level is either a leaf node, i.e., having zero (0) children tiles, or is subdivided into four (4) children tiles at the next level. Then, the application program 204 associates each graphic object in the collaboration space with a tile in the Quad-Tree structure. As those skilled in the art appreciate, the resulting Quad-Tree structure comprises nodes or tiles therein, the content of which comprises graphic objects associated therewith, and linkages representing the linking relationship of nodes or tiles.

FIGS. 6A to 6D illustrate an example of partitioning the collaboration space 300 into tiles of four levels using the Quad-Tree algorithm. For ease of illustration, the graphic objects 302 to 338 are omitted.

Figure 6A:
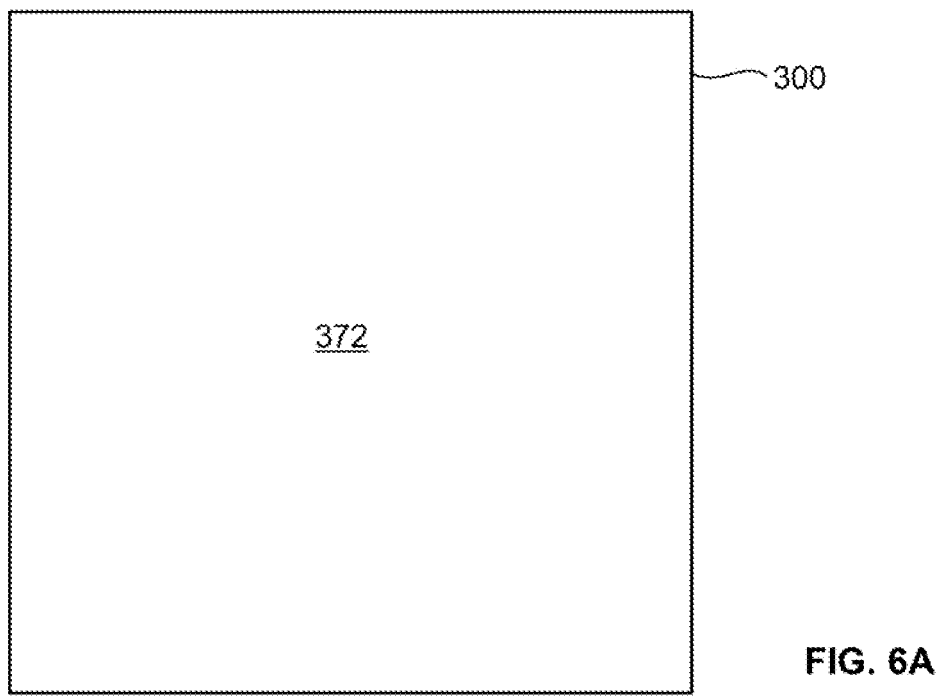
FIGS. 6A to 6D show the partitioning of the collaboration space of FIG. 6 into a Quad-Tree structure, performed by the interactive input system of FIG. 2.

As shown in FIG. 6A, the entire space 300 forms a square tile 372 at the first level L1 having a size of 80×80 pixels.

Figure 6B:
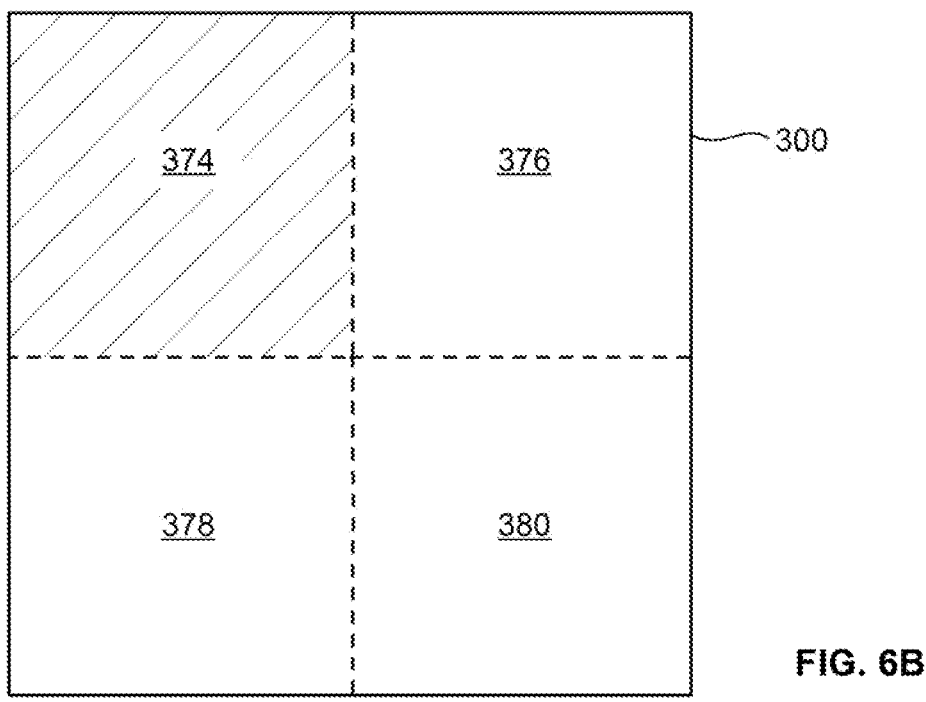

As shown in FIG. 6B, at the second level L2, the level 1 (L1) tile 372 is partitioned to four equal-size, square tiles, including a Top-Left (TL) tile 374, a Top-Right (TR) tile 376, a Bottom-Left (BL) tile 378 and a Bottom-Right (BR) tile 380. Each second level tile has a size of 40×40 pixels.

Figure 6C:
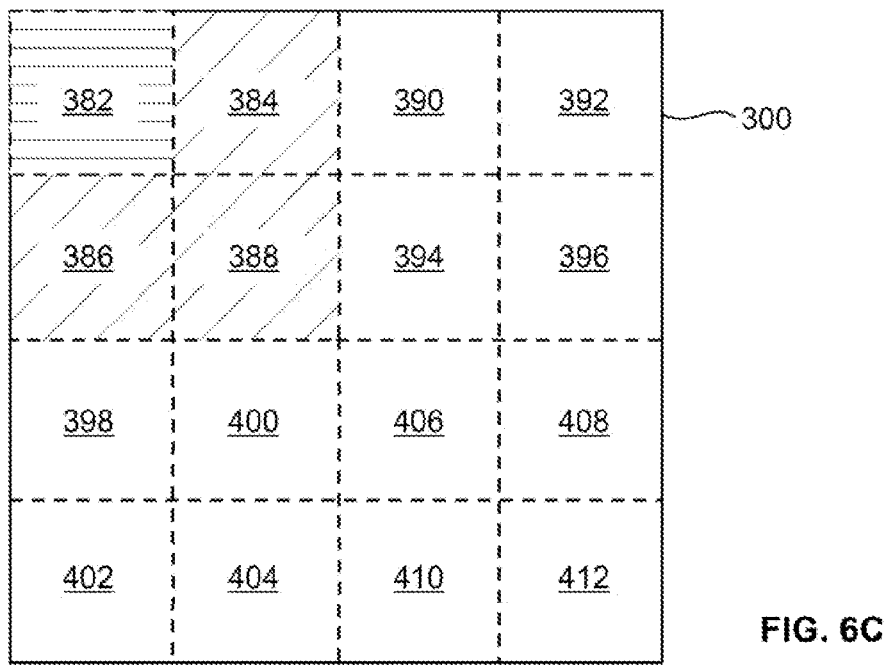

As shown in FIG. 6C, at the third level L3, each of the L2 tiles 374 to 380 is further partitioned to four equal-size, square tiles, including a TL, TR, BL and BR tile. For example, the L2 TL tile 374 is partitioned to a TL tile 382, a TR tile 384, a BL tile 386 and a BR tile 388. As L2 comprises four tiles, L3 then comprises 16 tiles 382 to 412. Each third level tile has a size of 20×20 pixels.

Figure 6D:
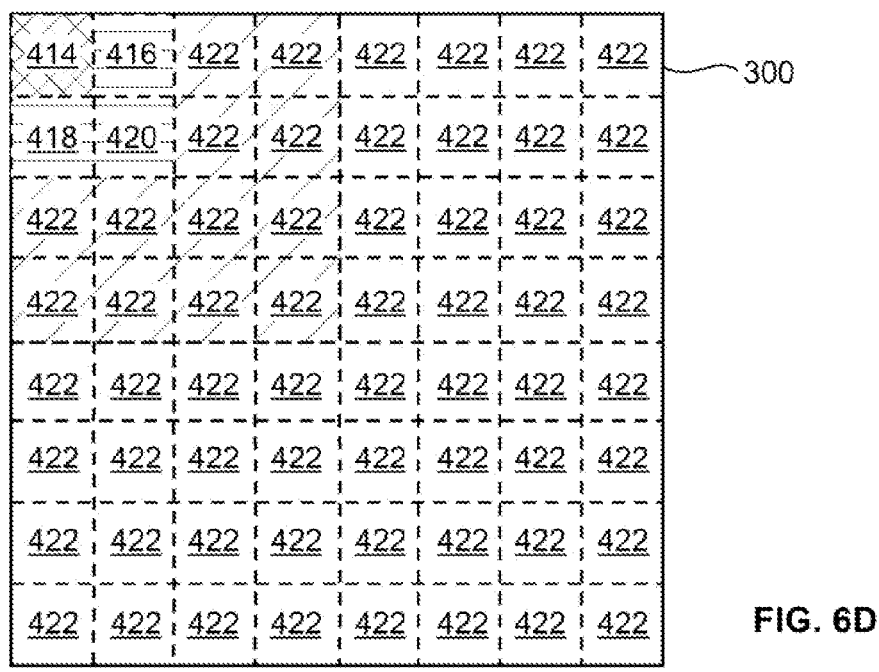

As shown in FIG. 6D, at the fourth level L4, each of the L3 tiles 382 to 412 is further partitioned to four equal-size, square tiles, including a TL, TR, BL and BR tile. For example, tile 382 at level L3 is further partitioned to four equal-size, square tiles, including 1 TL tile 414, a TR tile 416, a BL tile 418 and a BR tile 420. In this example, the partitioning of L3 tiles 382 to 412 gives rise to 64 tiles, including the four tiles 414 to 420, and 60 additional tiles generally marked with numeral 422. Each fourth level tile has a size of 10×10 pixels.

Figure 7:
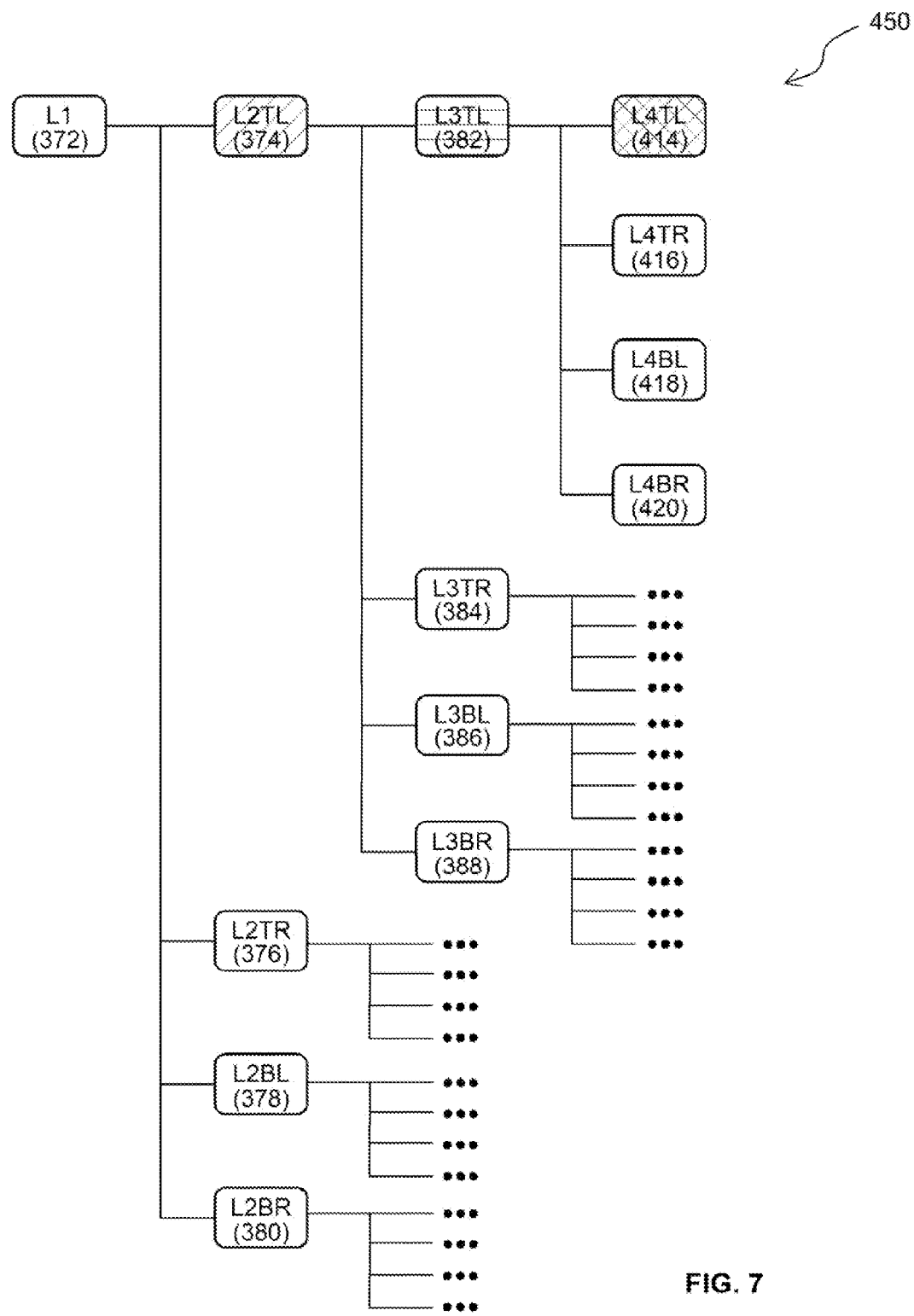
FIG. 7 illustrates the Quad-Tree structure of the partitioned collaboration space of FIG. 5.

The partitioned collaboration space 300 thus comprises a plurality of tiles at various levels after space partitioning. The partitioned collaboration space 300 may be represented by a tree structure which in this embodiment is a Quad-Tree structure wherein each node in the tree structure, except the nodes at the bottom level (also known as leaf nodes), is linked to four children nodes. The resulting Quad-Tree structure 450 is shown in FIG. 7, in which each node represents a tile, and is marked with the numeral of the corresponding tile in FIGS. 6A to 6D. For ease of illustration, only a portion of nodes are shown in FIG. 7.

The tree structure 450 originates from a root node or tile L1 representing the Level 1 tile 372. As tile 372 is partitioned to four tiles at L2, the root note L1 thus links four children nodes at level 2, i.e., nodes L2TL, L2TR, L2BL and L2BR representing L2 tiles 374 to 380, respectively. Similarly, each of the level 2 nodes also links four children nodes at level 3. Each of the level 3 nodes further links four children nodes at level 4.

After partitioning the collaboration space 300, the application program 204 associates each graphic object 302 to 338 with a tile, and stores each tile, including the graphic objects associated therewith, as a separate space record in the storage area 222 of the memory 220 such that the content of each space record may be independently accessed generally without accessing the content of other space records to any substantive amount. Those skilled in the art appreciate that, in some embodiments, the application program 204 may need to retrieve a small amount of data, e.g., the header, from a second space record in order to access a first space record. However, the retrieval of such a small amount of data generally does not incur significant computational cost.

In this embodiment, a space record is stored in the storage area 222 of the memory 220 as a file. However, those skilled in the art appreciate that, a space record may alternatively be in other suitable forms, e.g., in the form of a database record in a collaboration database.

Figure 8:
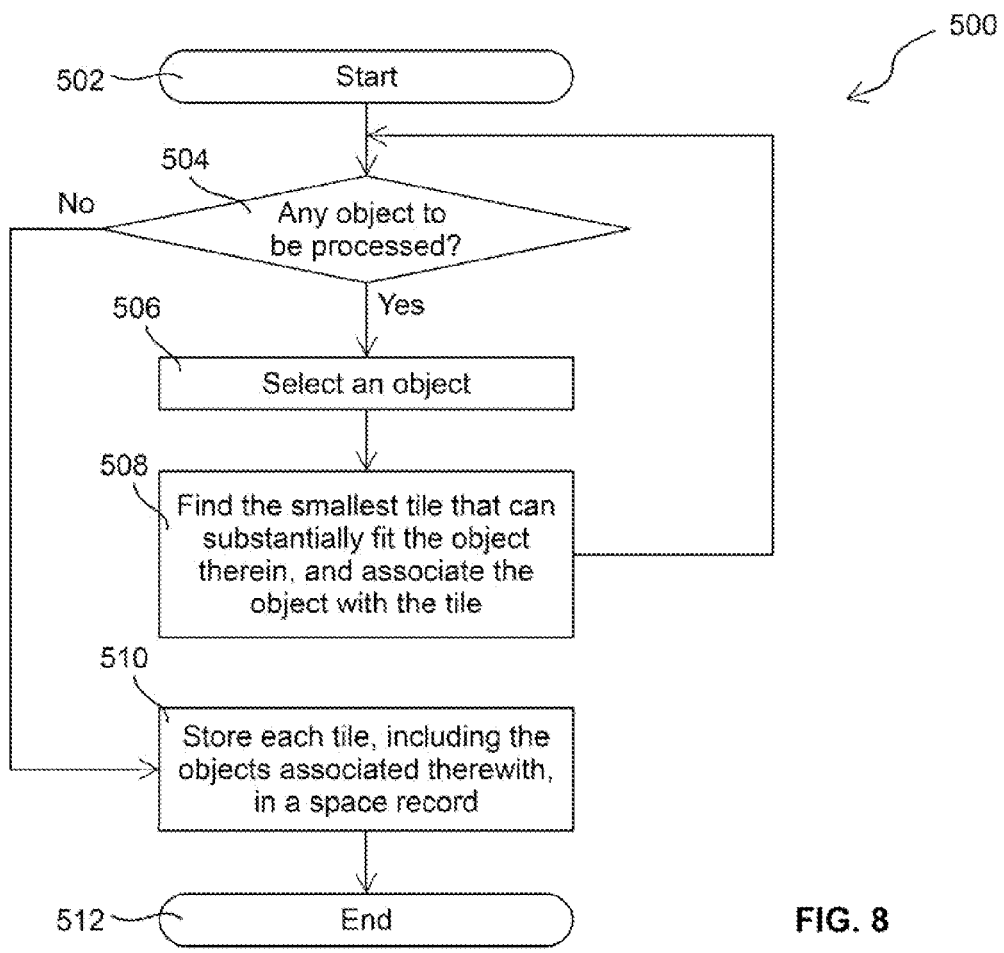
FIGS. 8 to 10 illustrate a flowchart showing steps of associating graphic objects to tiles in the Quad-Tree structure of the partitioned collaboration space, performed by the interactive input system of FIG. 2.

FIG. 8 is an exemplary flowchart 500 showing steps performed by the application program 204 for associating each graphic object with a tile (denoted as an object tile), and saving object tiles as space records. After the process starts (step 502), the application program 204 checks if the collaboration space 300 comprises any graphic objects to be processed (step 504). If so, the application program 204 selects a graphic object (step 506), and finds a smallest tile, i.e., a tile having the smallest size, in the partitioned collaboration space that can substantially accommodate the selected graphic object, and associates the selected graphic object therewith (step 508). Here, the term "substantially" means that the determined tile can accommodate a predefined portion, usually a predefined major portion that is greater than 50%, e.g., 80%, 90% or 100% in various embodiments, of the selected graphic object or can accommodate the entirety of the selected graphic object.

As will be described in more detail below, to determine whether or not a tile can substantially accommodate the selected graphic object, a comparison may be made between the tile and the graphic object to determine if the size of said tile is larger than that of at least a predefined portion of the graphic object; or alternatively, a comparison may be made between the tile and a bounding region of the graphic object to determine if the size of said tile is larger than that of at least a predefined portion of the bounding region of the graphic object.

Here, a bounding region is a shape having the smallest size and completely enclosing the graphic object. Of course, a shape having a size larger than the smallest size and completely enclosing the graphic object may alternatively be used as the bounding region. Generally, a bounding region has a simplified shape for simplifying calculation. Depending on the implementation, the bounding region may be a circle, a rectangle, an oval or other suitable shapes.

Following step 508, the process then loops back to step 504 to check if the collaboration space 300 still comprises any unprocessed graphic objects.

Figure 9:
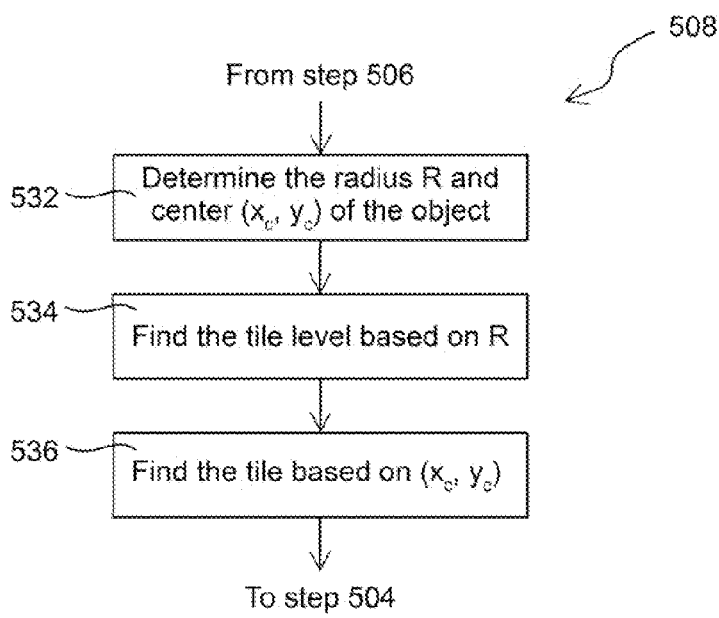

FIG. 9 shows the detailed steps of associating a graphic object with a tile (i.e., step 508 of FIG. 8). At step 532, the application program 204 first calculates a bounding region for the selected graphic object. Here, the bounding region is defined as a bounding circle which is the smallest circle completely enclosing the graphic object. The application program 204 determines the radius R and center ($x_c$, $y_c$) of the bounding circle. Then, the application program determines a suitable tile level based on the radius R of the bounding circle (step 534), and then determines the tile for the selected graphic object to associate therewith, based on the center ($x_c$, $y_c$) of the bounding circle (step 536).

Figure 10:
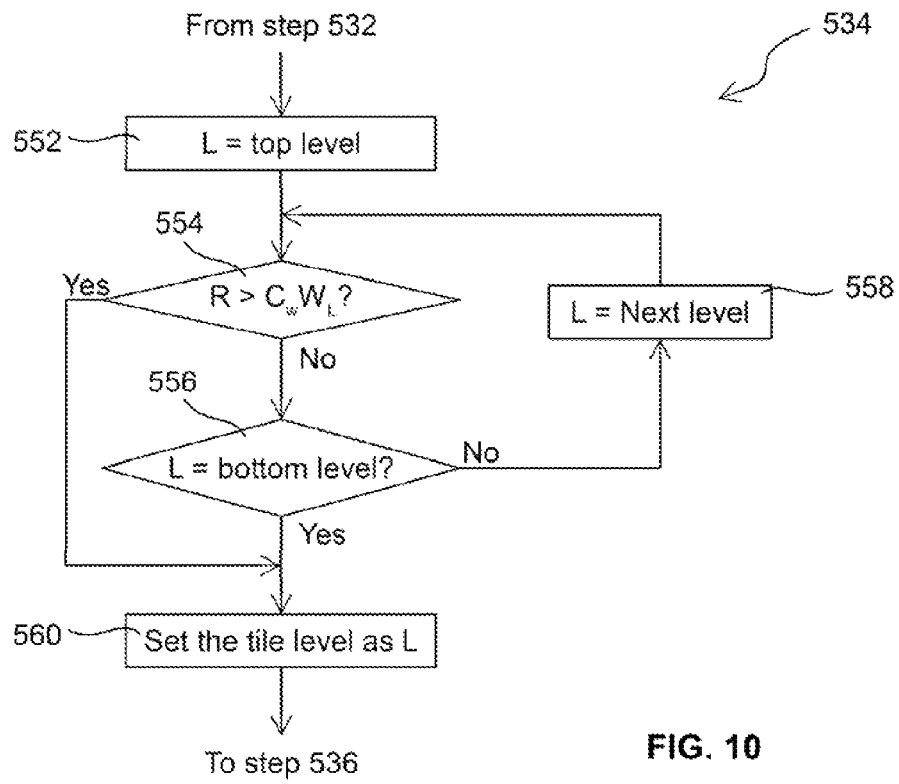

FIG. 10 shows the detailed steps of determining a suitable tile level for the selected graphic object (i.e., step 534 of FIG. 9). At step 552, the application program 204 starts from the top level by setting a level reference L to the top level L1. Then, at step 554, the application program 204 compares the radius R of the bounding circle of the selected graphic object with the tile width $W_L$ at this level weighted by a tile width weighting factor $C_w$, i.e., checking whether or not $R > C_w W_L$. In this embodiment, the tile width weighting factor $C_w$ equals to 0.25.

With tile width weighting factor $C_w$ being 0.25, the determined tile can receive the entirety of the selected graphic object.

If at step 554, it is determined that R is larger than $C_w W_L$ (the "Yes" branch of step 554), the process then goes to step 560, and the application program 204 sets the tile level as the level reference L. The process then goes to step 536 of FIG. 9.

If at step 554, it is determined that R is smaller than or equal to $C_w W_L$ (the "No" branch of step 554), the application program 204 further checks if the level reference L refers to the bottom level having the smallest tiles (step 556). If not, the application program 204 sets the level reference L to the next lower level (step 558), and the process loops back to step 554 to check if the graphic object belongs to this level.

If at step 556, the level reference L refers to the bottom level, the process then goes to step 560, and the application program 204 sets the tile level as the level reference L. The process then returns to step 536 of FIG. 9.

The iteration of step 554 generally finds a tile level for a graphic object to be the tile level of the smallest tiles that the width thereof is larger than or equal to the diameter of the bounding circle of the graphic object weighted by a factor $C_d$. In the embodiment wherein $C_d=1$, the iteration of step 554 generally finds a tile level for a graphic object to be the tile level of the smallest tiles that the width thereof is larger than or equal to the diameter of the bounding circle of the graphic object.

In the embodiment wherein the collaboration space are partitioned to square tiles, and the width of a parent tile is twice of that of its child tile, $C_d=1/(4C_w)$. Further, the tile level L to be found for a graphic object has to satisfy:

$$4RC_d > W_L >= 2RC_d, \text{ or}$$

$$R/C_w > W_L >= R/(2C_w),$$

where R is radius of the bounding circle of the graphic object, and $W_L$ is the width of tiles at level L.

Referring back to FIG. 9, after determining the tile level at step 534, the application program 204 finds the tile in the determined tile level for the selected graphic object to associate therewith, based on the center ($x_c$, $y_c$) of the bounding circle (step 536), which in this embodiment is the particular tile in the determined tile level that the point ($x_c$, $y_c$) falls within. The process then goes to step 504 of FIG. 8 to process any further graphic objects.

Referring back to FIG. 8, if at step 504 the application program 204 determines that all graphic objects in the collaboration space 300 have been processed, i.e., having been associated with a tile, the application program 204 then stores each tile, including the objects associated therewith, in the storage area 222 as an independently accesible record. In one particular embodiment, each record may be a file stored in the storage area 222 of the memory 220. Moreover, in this embodiment, the application program only stores the tiles that comprise at least one graphic object associated therewith (so-called "non-empty nodes" or "non-empty tiles"), i.e., the object tiles. Those skilled in the art appreciate that the application program may also store the tiles having no graphic object associated therewith but are linked intermediate between the root node L1 and a non-empty node in the Quad-Tree structure of FIG. 7 (so-called "empty-but-intermediate nodes" or "empty-but-intermediate tiles") for the ease of reconstructing the Quad-Tree structure when loading tiles of the collaboration space to the working area 224.

Figure 11A:
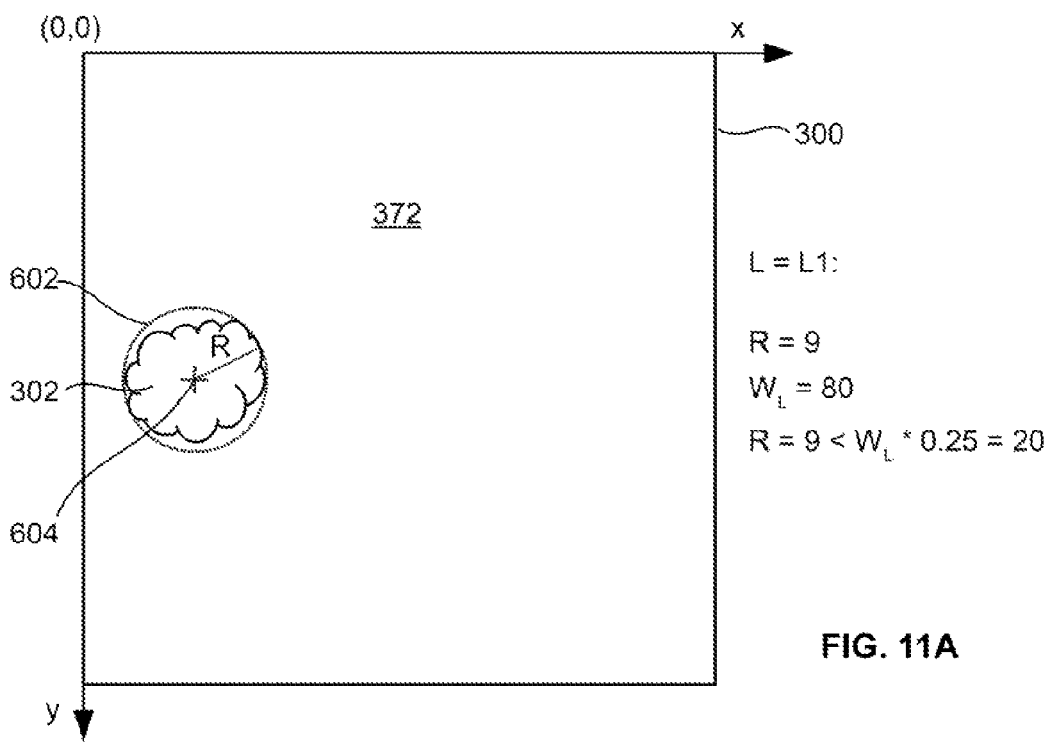
FIGS. 11A to 11C show an example of determining a tile in the Quad-Tree structure for associating with a graphic object, performed by the interactive input system of FIG. 2.
Figure 11B:
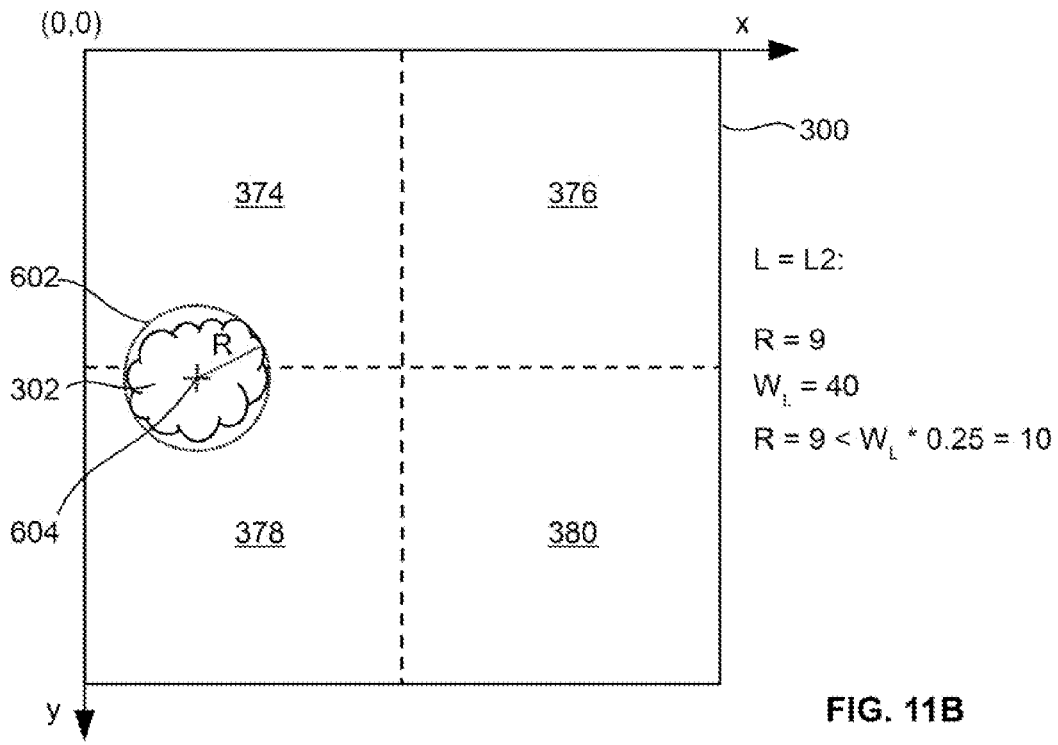
Figure 11C:
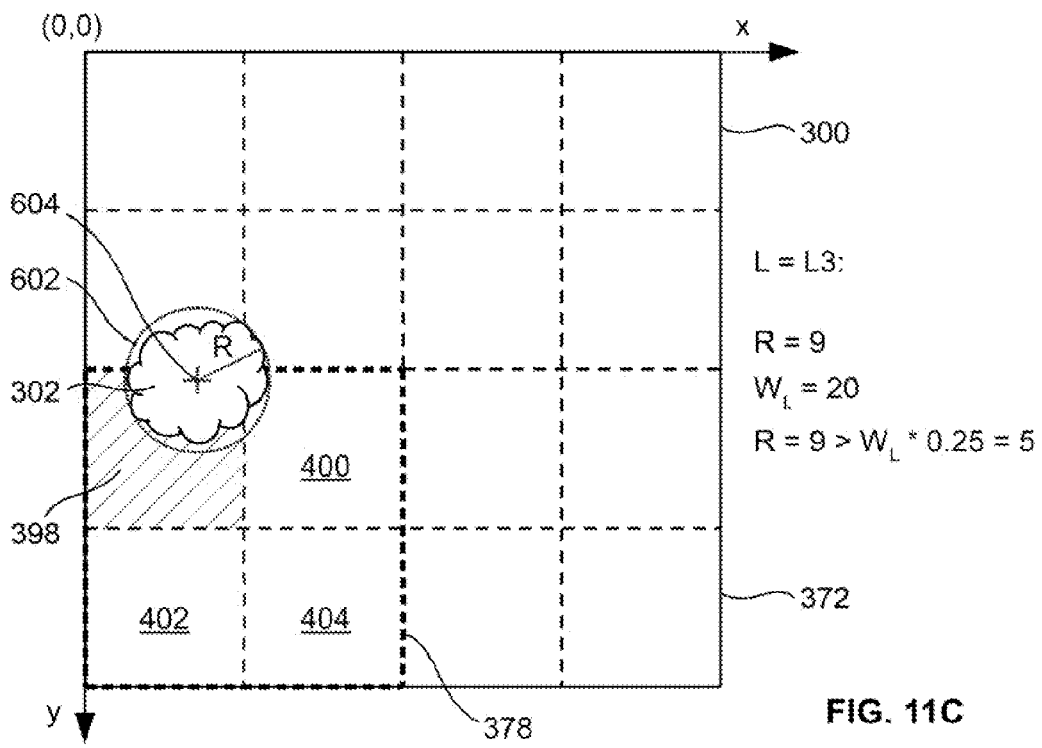

FIGS. 11A to 11C show an example of determining a tile to associate with the graphic object 302 of FIG. 5. As described above, the exemplary collaboration space 300 is a square space with a width of 80 pixels. After partitioning the collaboration space 300 to tiles in four levels, the tile width at levels L1, L2, L3 and L4 are: $W_1$=80 pixels, $W_2$=40 pixels, $W_3$=20 pixels, and $W_4$=10 pixels. For ease of illustration, the x-y coordinates of the collaboration space 300 is defined as having the origin at the top-left corner thereof with the x-axis increasing towards the right-hand side and the y-axis increasing downwardly.

Following the process in FIGS. 9 and 10, the application program 204 first determines that the radius R of a bounding circle 602 of the graphic object 302 is 9 pixels, and the x-y coordinates of center 604 of the bounding circle 602 is (15, 42) (step 532). Referring to FIG. 11A, the application program starts by setting the level reference L to the top level L1 (step 552), and compares R with $C_w W_1$ (step 554). As R=9, $C_w W_1$=0.25×80=20 and thus R<$C_w W_1$, the application program then sets the level reference L to the next lower level L2 (step 558).

As shown in FIG. 11B, the application program compares R with $C_w W_2$ (step 554). As R=9<$C_w W_2$=0.25×40=10, the application program then sets the level reference L to the next lower level L3 (step 558).

As shown in FIG. 11C, the application program compares R with $C_w W_3$ (step 554). As R=9>$C_w W_3$=0.25×20=5, the tile level for the graphic object 302 is therefore L3 (step 558).

After determining the suitable tile level, the application program 204 then determines that, among the tiles 382 to 412 at level L3 (see FIG. 6C), tile 398 overlaps with the center 604 of the bounding circle 602 of the graphic object 302, which is the TL tile of the tile 378 at level L2, which in turn is the BL tile of the top level tile 372 (step 536). Therefore, the graphic object 302 is associated with the tile 398.

Figure 12:
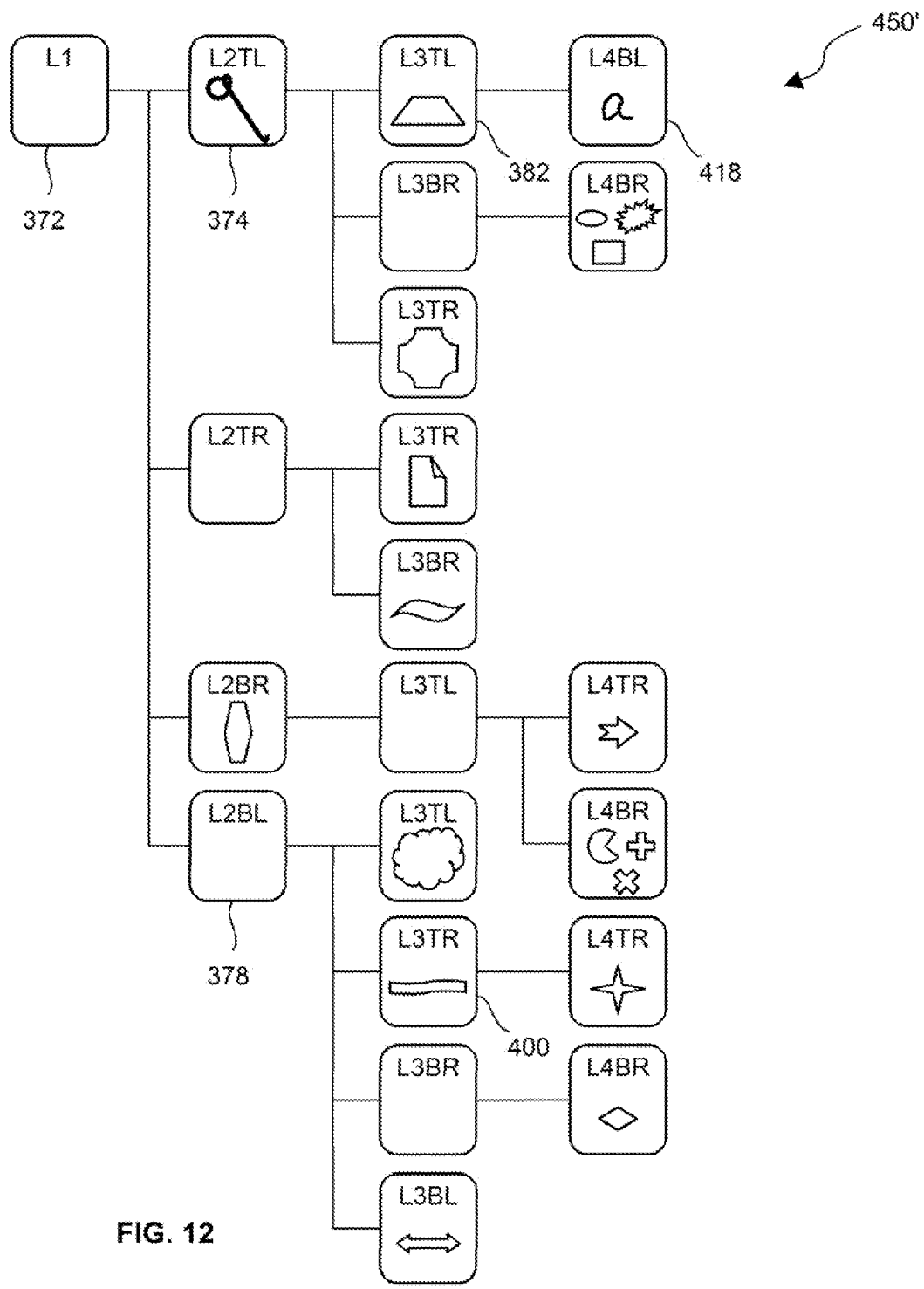
FIG. 12 illustrates the Quad-Tree structure of the partitioned collaboration space of FIG. 6 after the graphic objects in the collaboration space are associated with tiles in the Quad-Tree structure.

Following the same process, other graphic objects 304 to 338 in the collaboration space 300 are also associated with a respective tile. After all graphic objects are associated with their respective tiles, the Quad-Tree structure 450' having graphic objects associated therewith is shown in FIG. 12, which only shows the non-empty nodes and the nodes linked intermediate between the root node and a non-empty node. The tiles in the Quad-Tree structure 450', including the non-empty tiles and the empty-but-intermediate tiles empty but linking intermediate between the root node L1 and a non-empty node, are stored in the storage area 222 of the memory 220.

In the resulting Quad-Tree structure 450', graphic objects are associated with tiles in different levels in accordance with their sizes. Generally, larger graphic objects are associated with tiles of higher levels, and smaller graphic objects are associated with tiles of lower levels. Graphic objects in the collaboration space 300 are thus generally sorted by size in the resulting Quad-Tree structure 450'.

Those skilled in the art appreciate that, partitioning a collaboration space into a Quad-Tree structure and associating graphic objects with tiles of various levels does not change the z-order of any graphic object. As described later, when displaying the collaboration space in a viewport, which may be a display device of the interactive input system, the application program 204 determines tiles required for generating a display image of the viewport, and loads the required tiles from the storage area 222 to the working area 224. The application program 204 then renders the graphic objects in the loaded tiles according to their respective z-order to generate a display image of the viewport for display.

The application program 204 maintains the linkages of the Quad-Tree structure 450' and the required tiles, e.g., the tiles required for forming the display image of a viewport, in the working area 224 of the memory 220 during the collaboration session, and stores the Quad-Tree structure 450', including the linkages and tiles therein, to the storage area 222 of the memory 220 when the collaboration session is over. Those skilled in the art appreciate that, in some embodiments, the application program 204 may store the Quad-Tree structure 450' to the storage area 222 in response to a user's command during the collaboration session and/or when the collaboration session is over.

As described above, each tile of the Quad-Tree structure 450' is stored as a separate space record in the storage area 222. The linkages of the Quad-Tree structure 450', on the other hand, may be stored in the storage area 222 in any suitable manner in various embodiments.

For example, in one embodiment, the linkages of the Quad-Tree structure 450' is stored in the storage area 222 as a master record. In another embodiment, the linkages of the Quad-Tree structure 450' is stored in the space record of the root tile. In yet another embodiment, the application program 204 does not store the linkages of the Quad-Tree structure 450'. Rather, it records the space record of the root tile in a directory in the storage area 222, and stores in each tile the links to the children tiles thereof. In this embodiment, the application program 204 builds the linkages of the Quad-Tree structure 450' each time when loading the collaboration space 300.

In the above embodiment described in FIG. 10, the application program 204 iteratively checks all levels to determine a suitable tile level for a selected graphic object, which may be computationally costly if the collaboration space 300 is partitioned to tiles of a large number of levels. In a preferred embodiment, the application program 204 directly calculates the tile for a selected graphic object to associate therewith.

Let L=1, 2, . . . , N represent the partition level with L=1 representing the top level and L=N representing the bottom level. Let $W_L$ represent the tile width at level L. We have $W_{L-1}=2W_L$, for L=2, 3, . . . , N. Thus, $W_1$ represents the width of the entire collaboration space 300, $W_N$ represents the smallest tile width in the partitioned collaboration space 300, and $$W_N = W_1/2^{(N-1)},$$

where x^y represents the result of x to the power of y.

To determine the suitable tile level for a graphic object having a bounding circle with radius R and center ($x_c$, $y_c$), the application program first calculates a level $L_c$ in terms of the total number of levels N, bounding circle radius R and the collaboration space width $W_1$ as:

$$\begin{aligned} L_c &= \log_2(2R/W_N) \quad (1)\\ &= \log_2(2) + \log_2(R/(W_1/2^{(N-1)}))\\ &= N + \log_2(R) - \log_2(W_1) \end{aligned}$$

where $\log_2(x)$ is the function for calculating the logarithm of x to base 2. Then, the application program calculates a level index i as:

$$i = \text{CEILING}(L_c), \text{ if } L_c > 0, \text{ or} \qquad (2a)$$

$$i = 0, \text{ if } L_c \leq 0, \qquad (2b)$$

where CEILING(x) is the function for calculating the smallest integer that is larger than or equal to x. The suitable tile level $L_T$ is calculated as:

$$L_T = N - i, \qquad (3)$$

and the tile width at level $L_T$ is:

$$W_T = W_N 2^i. \qquad (4)$$

Now, let $(X_T, Y_T)$ represents the index of the tile to be associated with the graphic object, referring to the tile at the $L_T$ level positioned at the $X_T$-th column of tile counting from the leftmost column and the $Y_T$-th row counting from the topmost row, where $X_T \geq 0$ and $Y_T \geq 0$ are integers. Then, $(X_T, Y_T)$ is determined as:

$$X_T = \text{FLOOR}(x_c/W_T), \qquad (5)$$

$$Y_T = \text{FLOOR}(y_c/W_T), \qquad (6)$$

where FLOOR(x) is the function for calculating the largest integer that is smaller than or equal to x.

Figure 13:
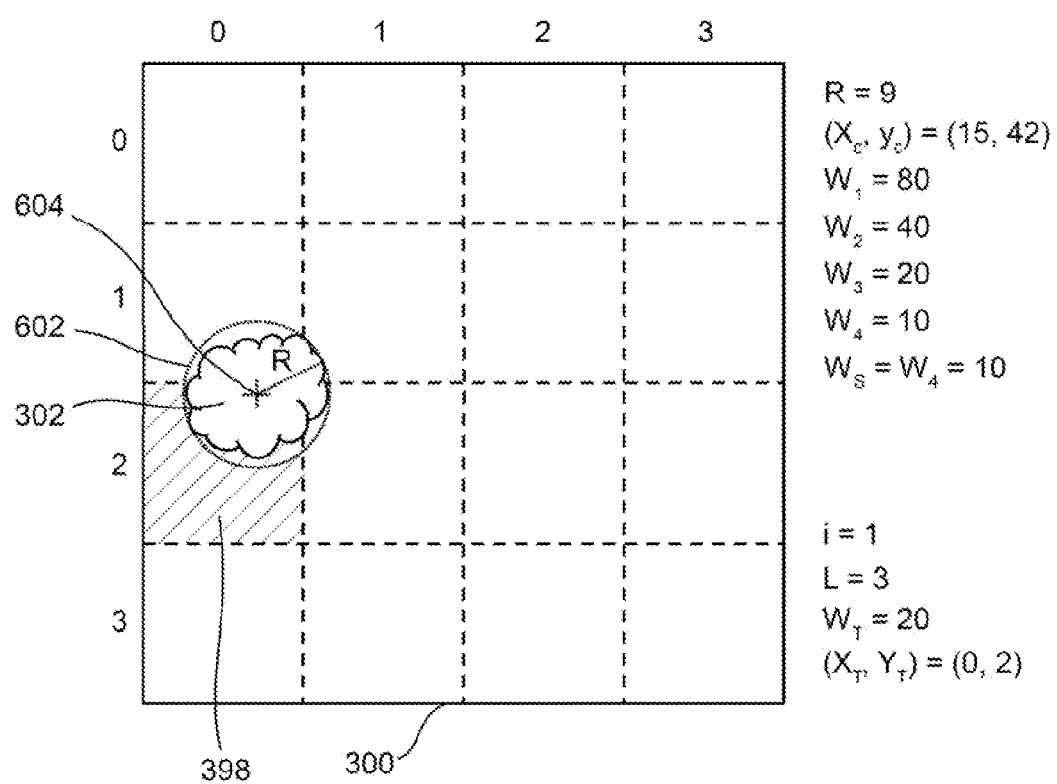
FIG. 13 shows an example of directly determining a tile in the Quad-Tree structure for associating with a graphic object, according to an alternative embodiment.

FIG. 13 shows an example of directly calculating the tile for associating with the graphic object 302 of FIG. 5. As described above, the radius R of a bounding circle 602 of the graphic object 302 is R=9 pixels, and the x-y coordinates of center 604 of the bounding circle 602 is $(X_c, Y_c) = (15, 42)$. The 80-pixel-by-80-pixel collaboration space 300 is partitioned to N=4 levels, and the smallest tile width is thus $W_N$=10 pixels.

Using equations (1) to (3) the application program 204 determines the calculated level $L_c$ as $L_c = \log_2(2R/W_N) = N + \log_2(R) - \log_2(W_1) \approx 0.85$. Thus the level index i=CEILING $(L_c) = 1$ as $L_c > 0$, and the suitable tile level $L_T = N - i = 3$.

Using equation (4), the tile width at level 3 is $W_T = W_N 2^i = 20$ pixels, and the tile indices $X_T = \text{FLOOR}(x_c/W_T) = 0$ and $Y_T = \text{FLOOR}(y_c/W_T) = 2$, i.e., the tile to be associated with the graphic object 302 is the (0, 2) tile at level 3, the tile denoted by numeral 398.

Figure 14:
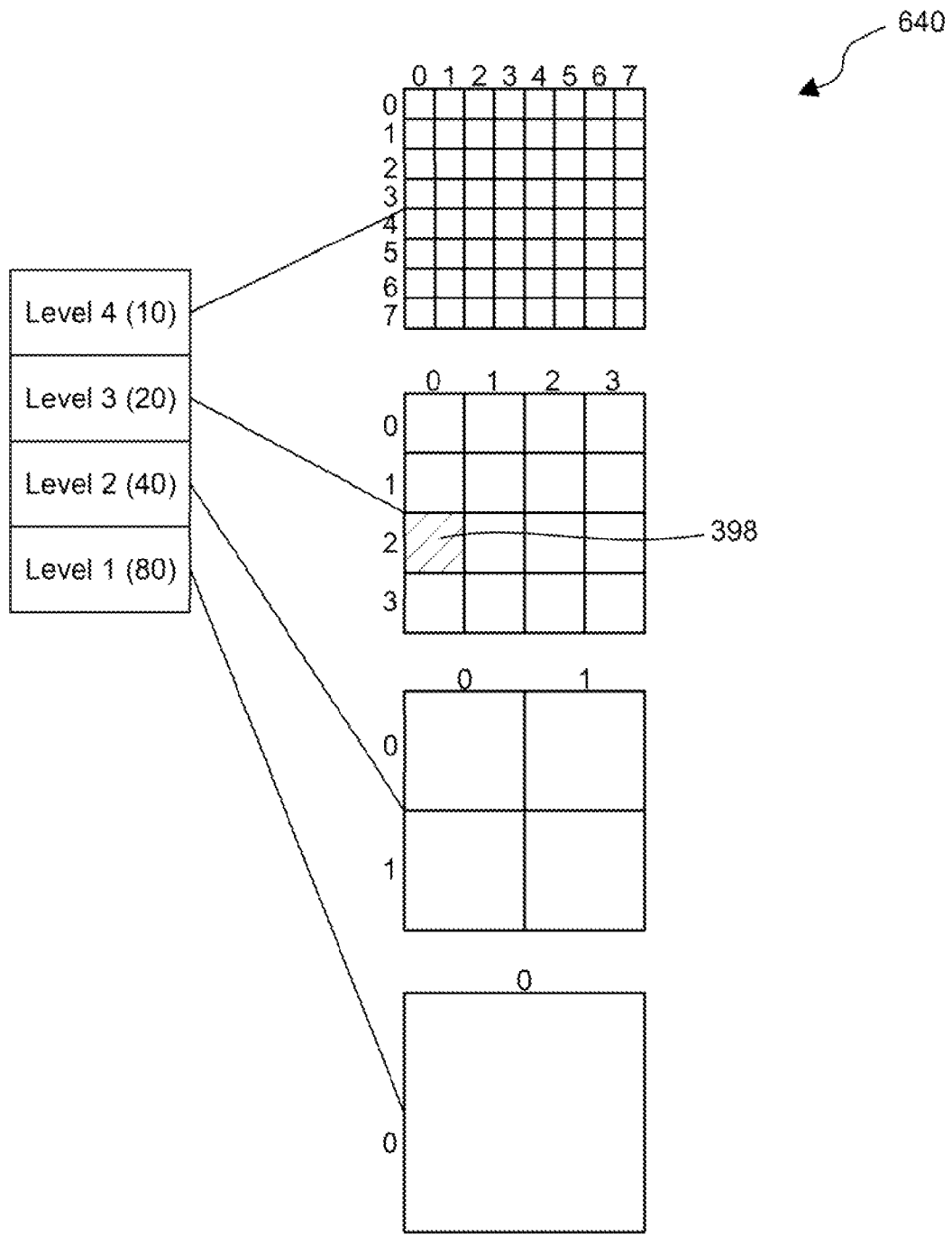
FIG. 14 illustrates the data structure of the partitioned collaboration space, according to an alternative embodiment.

FIG. 14 illustrates the data structure 640 of the partitioned collaboration space 300 in this embodiment, with the tile 398 showing with a hatched background for indicating that it comprises an associated graphic object, after the above process of determining the tile for the graphic object 302. In FIG. 14, tiles in each level are shown as an array for illustrative purpose. However, in implementation, the tiles in each level are organized in a hash table with the indices of the array being used as keys. Such an implementation allows the application program to only allocate memory storage for non-empty tiles. As a collaboration space usually comprises a relatively small number of non-empty tiles, a small number of space records are usually needed for storing the collaboration space 300.

The method of directly calculating the tile for a graphic object without iterating all levels of tiles gives rise to a "constant" computational time regardless of the number of levels that the collaboration space 300 is partitioned to (i.e., independent of N), and allows generally fast insertion of a graphic object to the collaboration space 300 when a user inserts a new graphic object or moves an existing graphic object to a new location that requires the application program 204 to move the graphic object to a new tile; in other words, the graphic object has to be removed from the tile it was originally associated therewith, and be re-associated with another tile.

Partitioning a collaboration space into tiles of various levels and storing each tile separately allows the application program 204 to efficiently use the working area 224 of the memory 220.

Figure 15:
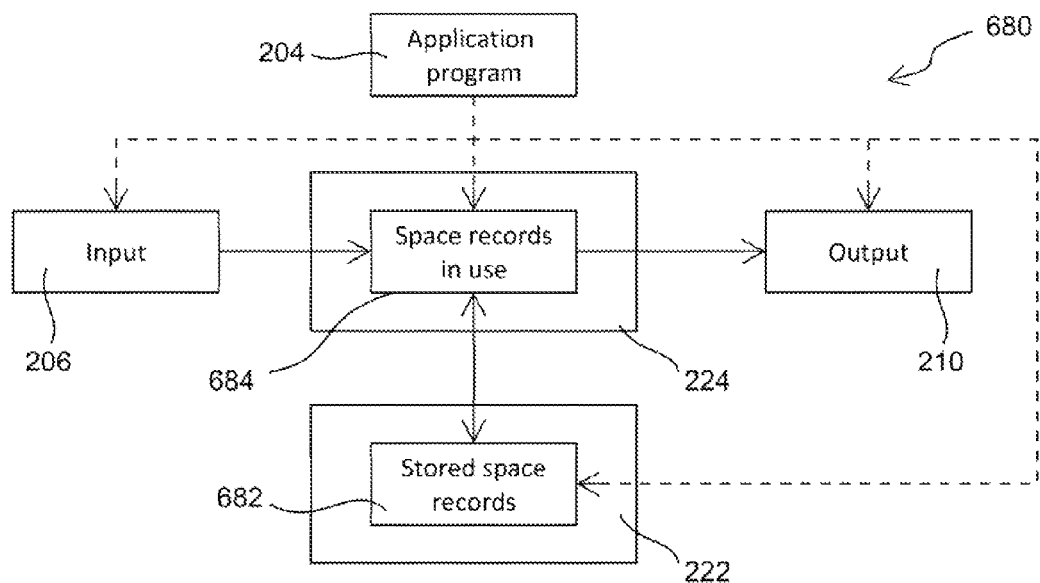
FIG. 15 is a simplified block diagram showing a software structure of the interactive input system of FIG. 2 during a collaboration session.

FIG. 15 is a simplified block diagram showing the software structure 680 of the interactive input system 100 during a collaboration session. As shown, the collaboration space 300 is stored in the storage area 222 of the memory 220 as space records 682. During collaboration, the application program 204 maintains the Quad-Tree structure of the collaboration space, and only loads required tiles or space records 684 from the storage area 222 to the working area 224. The application program 204 manipulates the loaded tiles 684 in response to input 206, and sends the manipulation results to the output 210 for, e.g., forming a display image to be shown on a display. The processed tiles 684 may be stored to the storage area 222 as stored space records 682.

In response to input 206, the application program 204 may also load other tiles from the storage area 222 into the working area 224, and remove some tiles from the working area 224. For example, a user may initiate a command to display another portion of the collaboration space 300 on a viewport. As described before, the viewport in this embodiment is a display device local to the memory 106.

In response to the user's command, the application program 204 removes the tiles no longer necessary for display from the working area 224, and determines the tiles required for forming a display image of the viewport, and loads the required tiles from the storage area 222 into the working area 224 if they have not been loaded.

Figure 16:
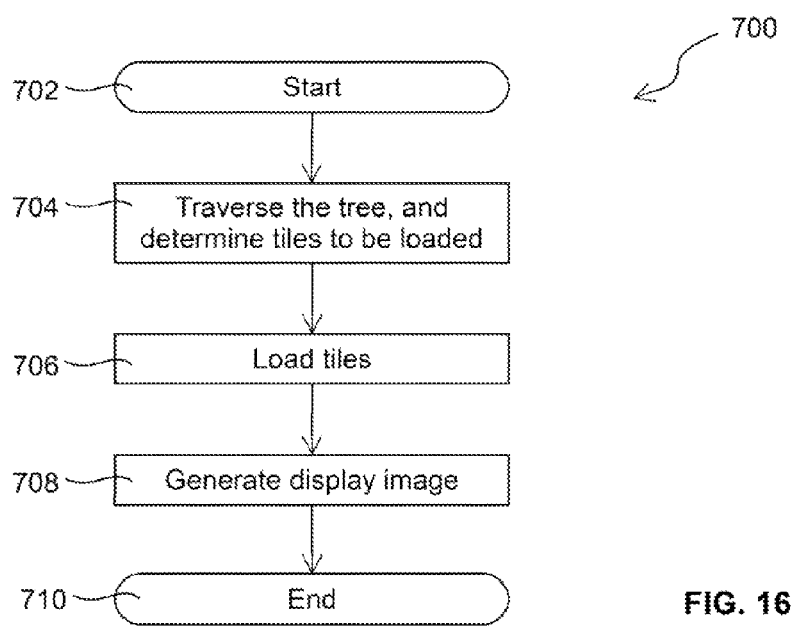
FIGS. 16 and 17 illustrate a flowchart showing steps of generating a display image of a viewport, performed by the interactive input system of FIG. 2.

In one embodiment, the application program 204 conducts hit tests between tiles and the viewport to determine the tiles required for forming a display image of the viewport. FIG. 16 is a flowchart 700 showing steps performed by the application program 204 for determining the tiles to be loaded for generating a display image of a viewport.

The process starts when a display image of a viewport is to be generated for displaying the collaboration space 300 therein (step 702). After the process starts, the application program traverses the linkages of the Quad-Tree structure 450' of the partitioned collaboration space 300 and determines the tiles to be loaded for generating the display image (step 704). Those skilled in the art appreciate that any suitable tree-search algorithm known in the art, e.g., a depth-first algorithm or a breadth-first algorithm, may be used for traversing the linkages of the Quad-Tree structure 450'. The detail of such algorithm is thus omitted, and is generally described as "selecting next tile".

Figure 17:
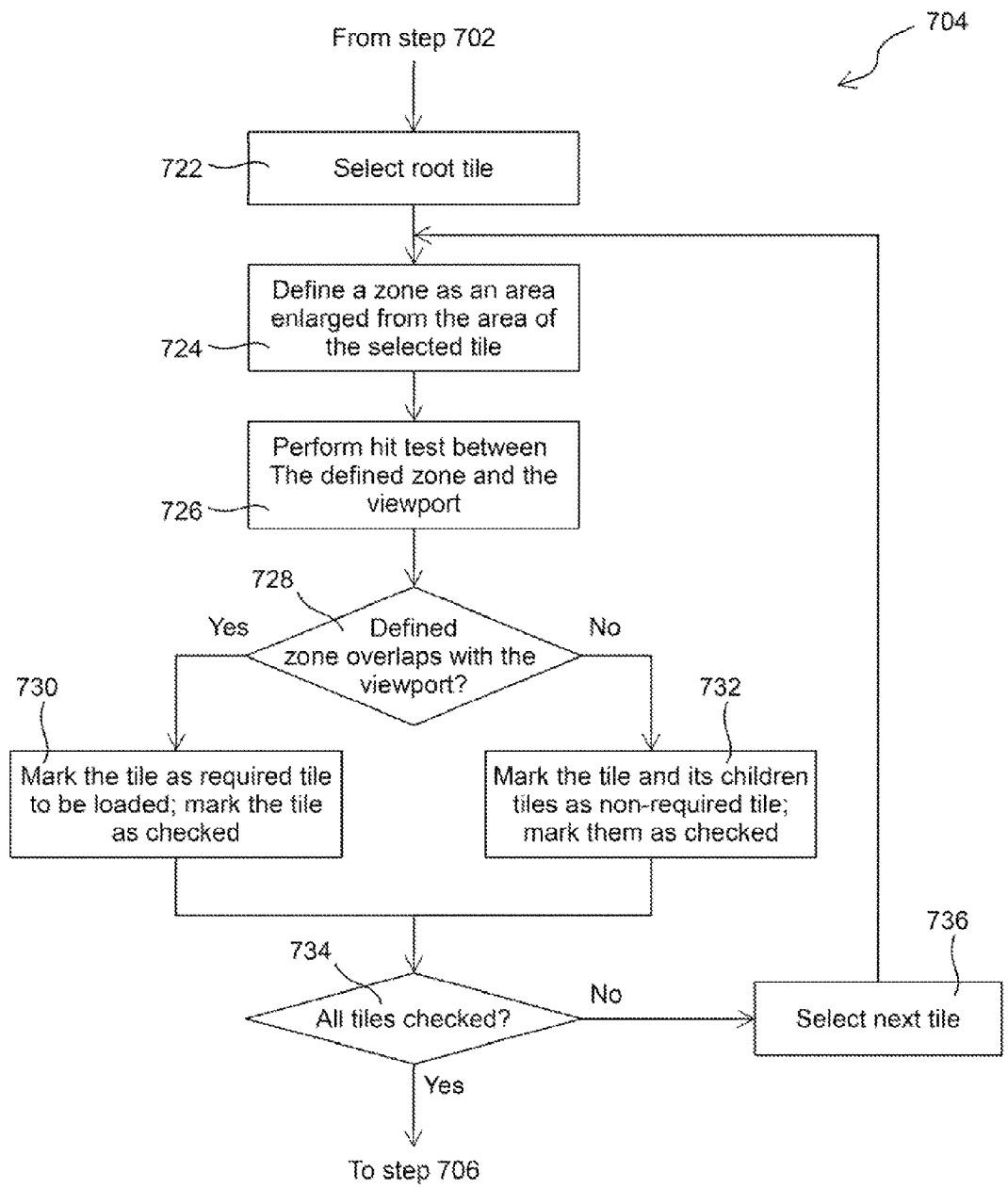

FIG. 17 shows the detail of step 704 of FIG. 16 of finding required tiles to be loaded. At step 722, the application program 204 selects the root tile or node of the Quad-Tree structure 450' to determine if the root tile is required to be loaded. At step 724, the application program 204 defines a zone for the selected tile. At this step, the zone is defined as an area concentric with the selected tile, with a width or dimension equal to that of the selected tile weighted by a predefined factor $C_b$, where $C_b > 1$. In other words, the zone is an area enlarged from the area of the selected tile with each of its four sides enlarged from the corresponding side of the selected tile by $(C_b - 1)/2$. In this embodiment, the factor $C_b$ is 2 for a 50% buffering.

The application program 204 then performs a hit test between the defined zone and the viewport to determine if they are overlapped (step 726). If the defined zone overlaps with the viewport (step 728), the application program 204 then marks the selected tile as a required tile to be loaded, and marks it as checked (step 730). The process then goes to iteration step 734.

Alternatively, at step 728, if the defined zone does not overlap with the viewport, the application program 204 then marks the selected tile as a non-required not to be loaded, and marks the selected tile and all of its children tiles, including children tiles directly linked thereto and children tiles indirectly linked thereto via one or more intermediate children tiles of the selected tile, as non-required tiles and as checked (step 732).

At iteration step 734, the application program 204 checks if all tiles have been checked. If not, the application program 204 selects the next tile (step 736), and the process loops back to step 724.

If, at step 734, it is determined that all tiles in the Quad-Tree structure 450' have been checked, the process then returns to step 706 of FIG. 16.

Referring back to FIG. 16, at step 706, the application program 204 loads the required tiles. The application program 204 then uses the content of these required tiles to generate a display image for the viewport to display (step 708). The process ends after the generated display image is sent to the output for display (step 710).

Figure 18:
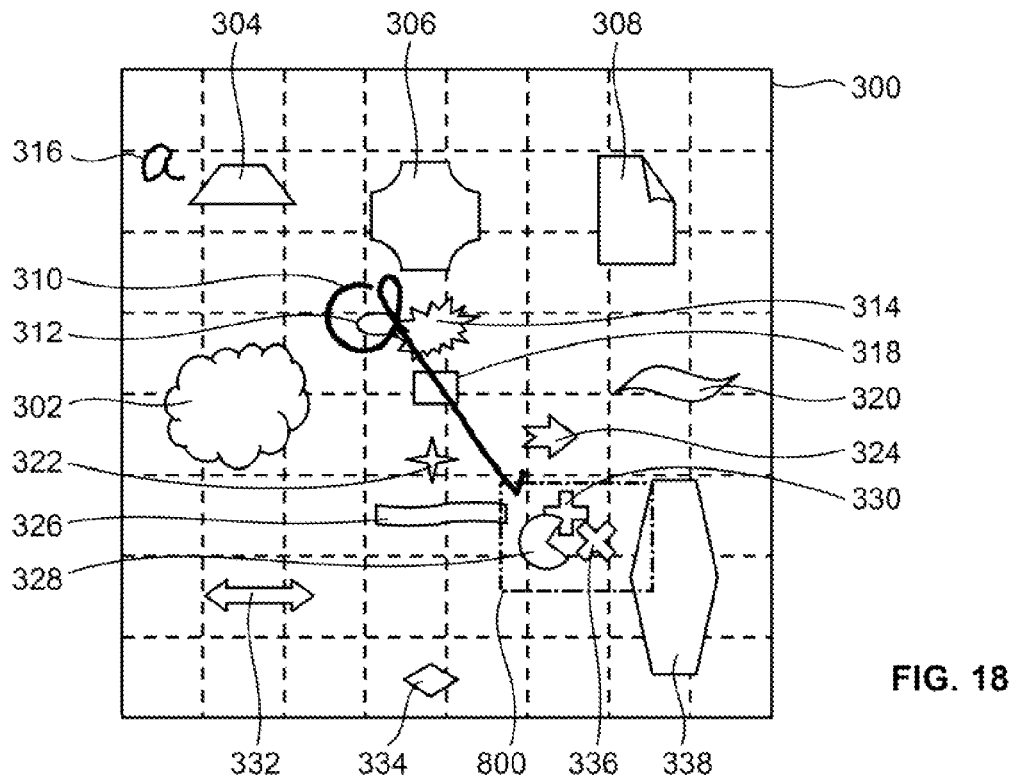
FIG. 18 shows an example of a collaboration space and a viewport showing a portion thereof.

FIG. 18 shows an example of generating a display image of a viewport 800 displaying a portion of a collaboration space 300 of FIG. 5. In this example, a user has zoomed in the display of the collaboration space such that the viewport 800 only displays a portion of the collaboration space 300 fully encompassing graphic objects 328, 330 and 336, and partially encompassing graphic objects 310, 326 and 338.

As described above, the collaboration space 300 has been partitioned to tiles in four levels as shown in FIG. 12. Following the process of FIGS. 16 and 17, the application program 204 traverses the linkages of the Quad-Tree structure 450' of the partitioned collaboration space 300. The application program 204 starts the tree traversal from the root node L1, as shown in this case, tile 372. As tile 372 encompasses the entire collaboration space 300, it always overlaps with the viewport 800 and is therefore marked as a required tile to be loaded. However, as tile 372 is not associated with any graphic object, loading tile required 372 does not cost any computational time or any space in the working area 224 that is normally associated with loading a graphic object.

Then, the application program 204 checks whether or not the first node at level 2, i.e., the L2TL tile 374 at level 2, shall be loaded.

Figure 19A:
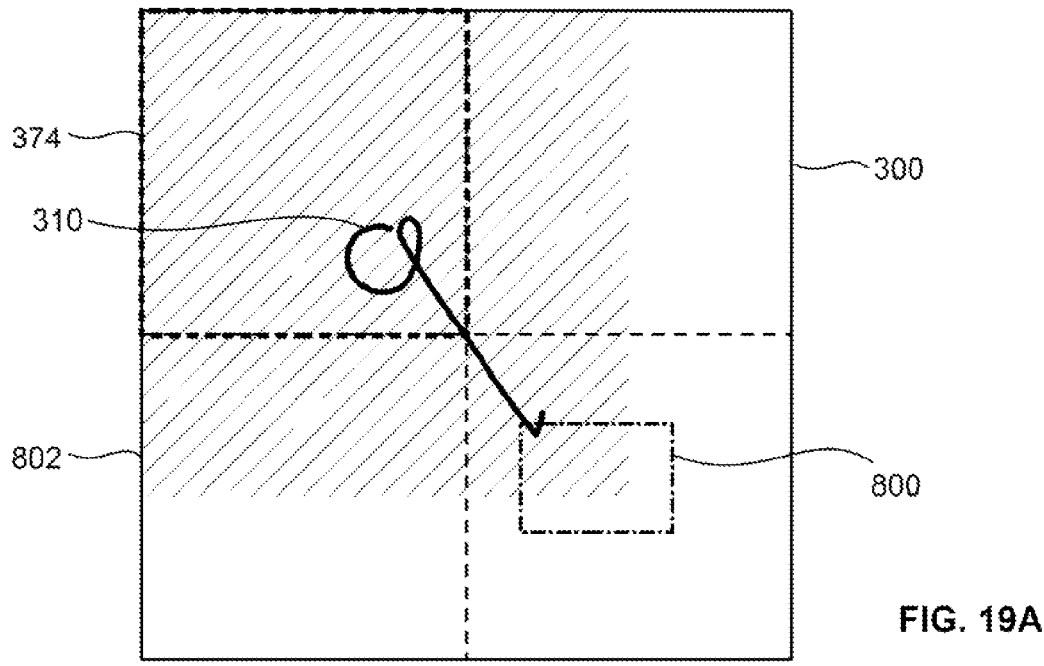
FIGS. 19A to 19C show an example of determining tiles required for generating a display image of the viewport, performed by the interactive input system of FIG. 2.

As shown in FIG. 19A, the application program first defines a zone 802 concentric with the tile 374, with a width equal to that of the tile 374 weighted by a predefined factor $C_b$ of 2 (step 724). In other words, the zone 802 is an area enlarged from the area of the tile 374 with each of its four sides enlarged from the corresponding side of the tile 374 by $(C_b-1)/2=50\%$. In FIG. 19A, the enlargement from tile 374 on its left and top sides is not shown as it goes beyond the collaboration space 300.

The application program 204 then performs a hit test between the defined zone 802 and the viewport 800 (step 726), and determines that the defined zone 802 overlaps with the viewport 800 (the "Yes" branch of step 728). Tile 374 is thus marked as a required tile to be loaded (step 730). As tile 374 is associated with the graphic object 310, loading the required tile 374 will load the graphic object 310 into the working area 224.

In this example, the application program 204 uses a depth-first algorithm to traverse the linkages of the Quad-Tree structure 450'. Therefore, after checking the top-left tile 374 at level 2, the application program 204 checks whether or not its child node L3TL, i.e., the tile 382 at level 3, shall also be required to be loaded.

Figure 19B:
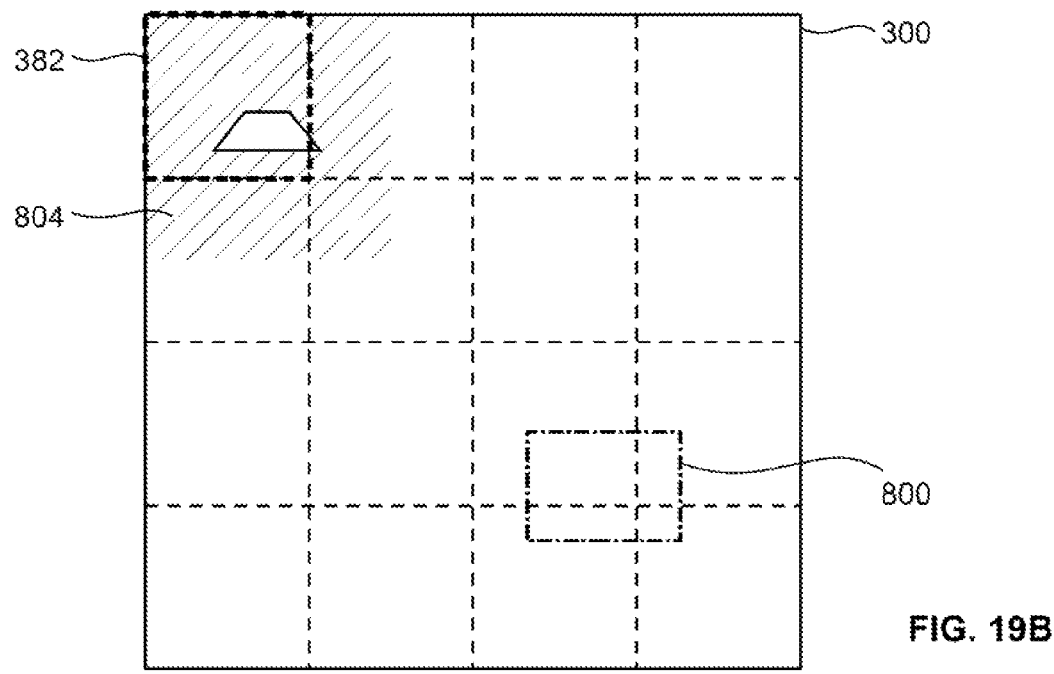

As shown in FIG. 19B, the application program first defines a zone 804 concentric with the tile 382, with a width equal to that of the tile 382 weighted by a predefined factor $C_b$ of 2 (step 724). Again, in FIG. 19B, the enlargement from tile 382 on its left and top sides is not shown as it goes beyond the collaboration space 300.

The application program 204 then performs a hit test between the defined zone 804 and the viewport 800 (step 726), and determines that the defined zone 804 does not overlap with the viewport 800 (the "No" branch of step 728). Tile 382 and its child node L4BL, i.e., tile 418, are thus marked as a non-required tile not to be loaded (step 732).

Figure 19C:
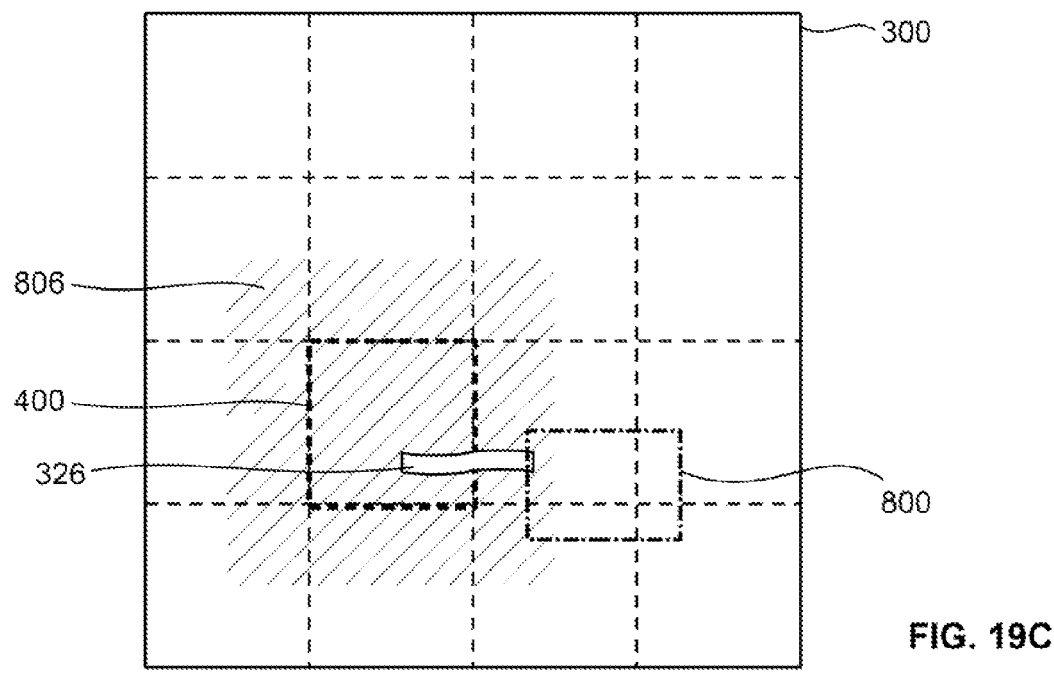

The process repeats to check other tiles in the Quad-Tree structure 450'. FIG. 19C shows the checking of the level 3 node L3TR, i.e., tile 400. Similar as above, the application program 204 checks whether or not the node L3TR linked to the L2BL node, i.e., the tile 400 at level 3, shall be loaded.

As shown in FIG. 19C, the application program first defines a zone 806 concentric with the tile 400, with a width equal to that of the tile 400 weighted by a predefined factor $C_b$ of 2 (step 724). The application program 204 then performs a hit test between the defined zone 806 and the viewport 800 (step 726), and determines that the defined zone 806 overlaps with the viewport 800 (the "Yes" branch of step 728). Tile 400 is thus marked as a required tile to be loaded (step 730). As tile 400 is associated with the graphic object 326, loading tile 400 will load the graphic object 326 into the working area 224.

Figure 20:
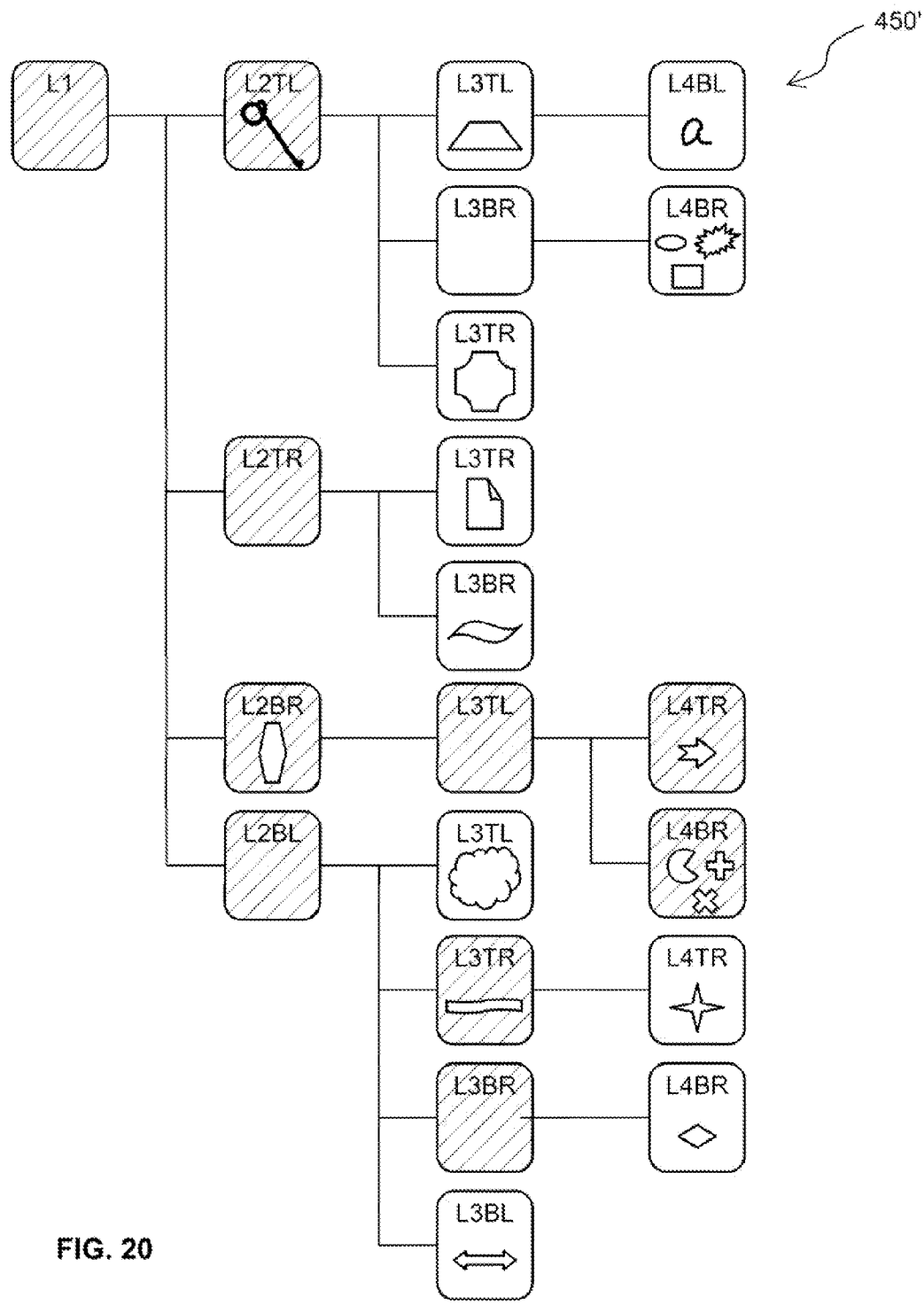
FIG. 20 shows the Quad-Tree structure of FIG. 12 after checking all nodes therein, showing the tiles to be loaded to a working memory area.
Figure 21:
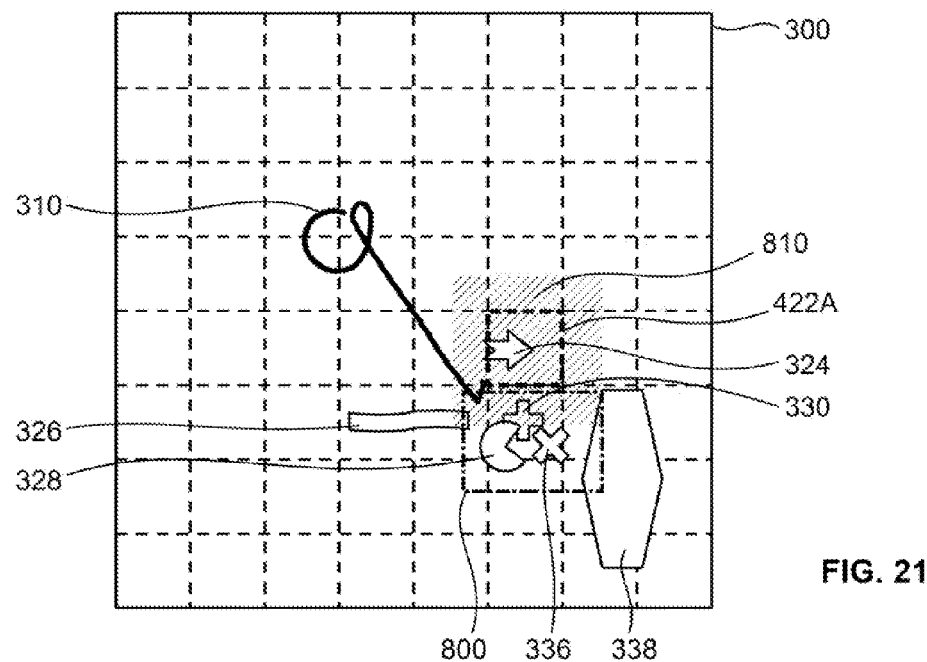
FIG. 21 shows the graphic objects loaded for generating a display image of the viewport.

FIG. 20 shows the Quad-Tree structure 450' after checking all nodes therein. The nodes of the required tiles to be loaded to the working area 224 are hatched therein. FIG. 21 also illustrates the graphic objects that are loaded to the working area 224. As can be seen, all graphic objects 310, 326, 328, 330, 336 and 338 that overlap with the viewport 800 are loaded into the working area 224.

The graphic object 324 is also loaded into the working area 224 as the defined zone 810 enlarged from the area of the tile 422A that the graphic object 324 is associated therewith does overlap with the viewport 800. However, it is not visible in the viewport 800. Although loading the graphic object 324 causes extra overhead, loading it may be beneficial when a user moves the viewport to encompass the graphic object 324, in which case the preloaded graphic object 324 in the working area 224 facilitates fast generation of viewport display.

Figure 22A:
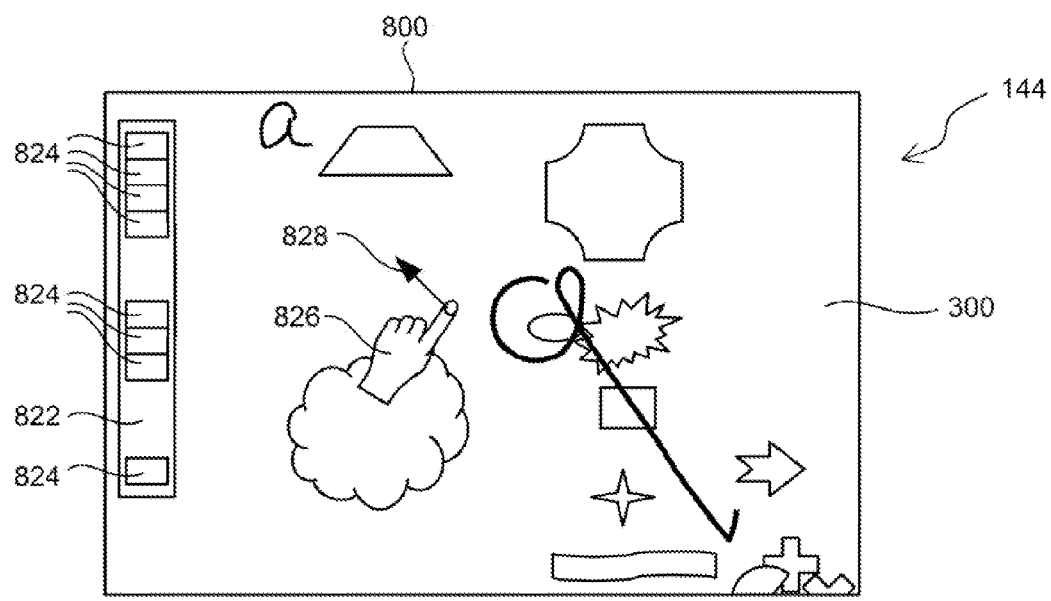
FIGS. 22A to 22C illustrate an example of user manipulating a collaboration space.
Figure 22B:
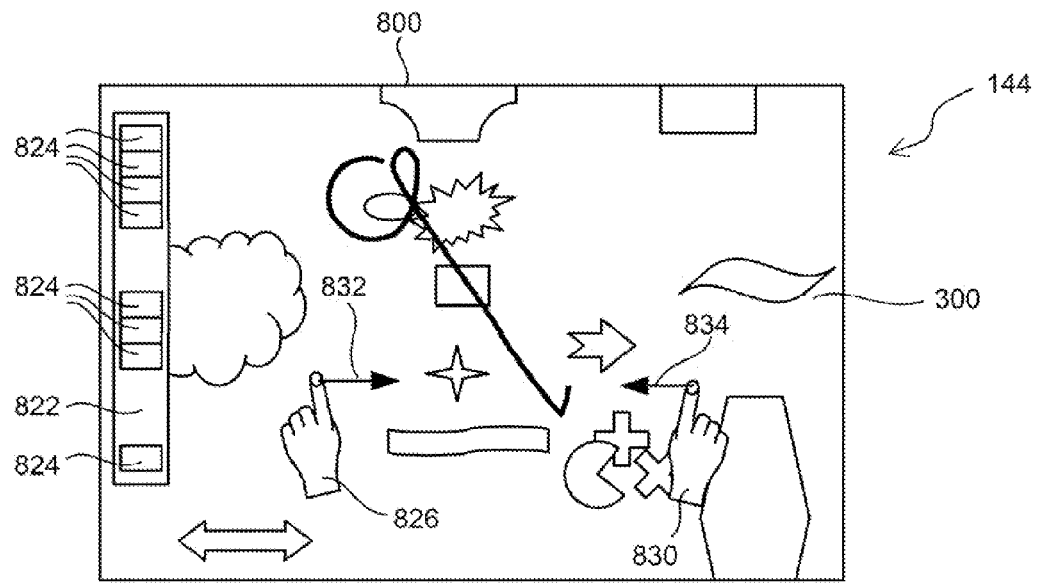
Figure 22C:
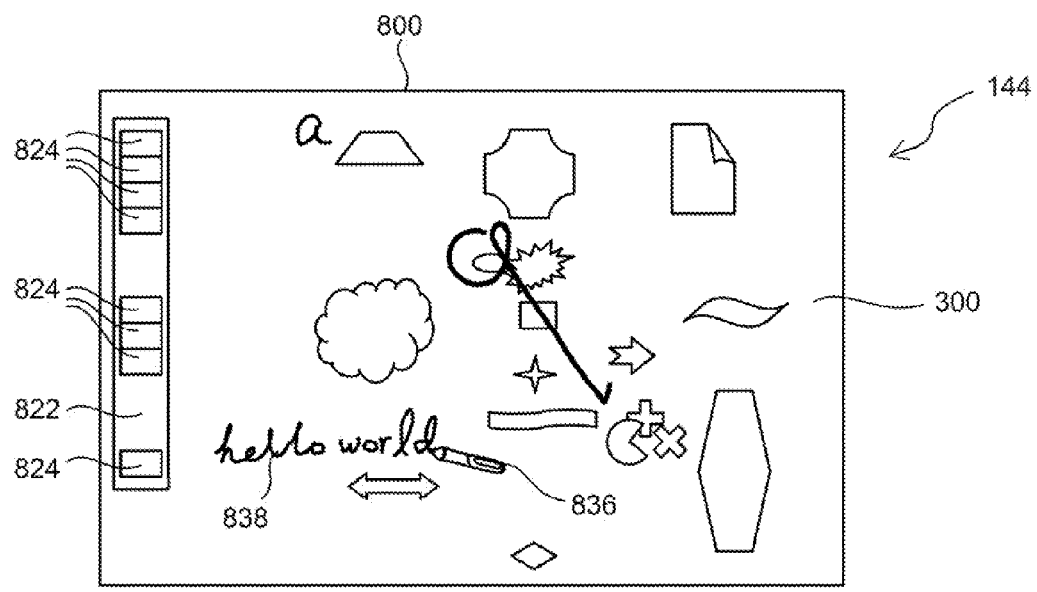

FIGS. 22A to 22C illustrate an example of user manipulation of the collaboration space 300. In this example, the interactive input system 100 executes the application program 204 in a full screen mode to use the entire interactive surface 144 for displaying the collaboration space 300. Therefore, the entire interactive surface 144 is the viewport 800, displaying a portion of the collaboration space 300. The application program 204 uses the above-mentioned method to determine tiles necessary for forming the display image of the viewport 800, loads the determined tiles and forms the display image of the viewport 800, as shown in FIG. 22A. The application program 204 also superimposes a toolbar 822 having a plurality of tool buttons 824 over the displayed collaboration space 300, which provides a plurality of tools for user to manipulate the collaboration space 300 and graphic objects therein. A user may apply a pointer 826, such as a finger, in contact with the interactive surface 144 at a location overlapping the background of the collaboration space 300, and slide the pointer 826 towards upper-left as indicated by the arrow 828, to apply a panning gesture to the collaboration space 300. In response to the panning gesture, the application program "moves" the collaboration space 300 along the direction of the panning gesture, or equivalently, moves the viewport 800 in a position opposite to that of the panning gesture. The application program 204 uses the above-mentioned method to determine in real-time the tiles necessary for forming the display image of the viewport 800, loads the determined tiles, and forms the display image of the viewport 800 to update the display, as shown in FIG. 22B.

In FIG. 22B, the user may apply two fingers 826 and 830 in contact with the interactive surface 144 overlapping the background of the collaboration space 300, and move the fingers 826 and 830 towards each other as indicated by the arrows 832 and 834, respectively, to apply a zooming-out gesture. In response, the application program 204 zooms out the display of the collaboration space 300, as shown in FIG. 22C.

In FIG. 22C, the user further applies a pen tool 836 in contact with the interactive surface 144 and writes thereon. In response, the application program 204 detects the movement of the pen tool 826 and injects annotation 838 into the collaboration space. The newly injected annotation 838 is inserted to the Quad-Tree structure 450' and associated with a tile following the method described above.

In above embodiments, the application program 204 determines the required tiles necessary for forming a display image of the viewport 800, and forms a display image of the viewport 800. The display image is displayed after all required tiles have been loaded to the working area and the content therein have been rendered to the display image. In an alternative embodiment, the application program 204 renders the display image immediately after a required tile is loaded, and displays the updated display image immediately after rendering. A progressive display effect is thus achieved wherein graphic objects appear in the viewport one after another. For example, if a top-down, breadth-first, tree-traversal algorithm is used for traversing the Quad-Tree structure from the root node, larger graphic objects are generally displayed before smaller graphic objects. If a bottom-up, breadth-first, tree-traversal algorithm is used for traversing the Quad-Tree structure, smaller graphic objects are generally displayed before larger graphic objects. If a depth-first, tree-traversal algorithm is used for traversing the Quad-Tree structure, a "localized" progressive display effect is achieved wherein graphic objects in a first area of the collaboration space are first displayed, and then are those in another successive area thereof.

In above embodiments, a collaboration space is partitioned to tiles of a predefined number of levels. In an alternative embodiment, the application program 204 dynamically determines the number of partitioning levels. For example, when the application program creates a new collaboration space, a top level (i.e., the first level) tile is defined as the entire collaboration space. When a user inserts a graphic object into the collaboration space, the application program calculates in real-time a tile level n for a square tile with a width $W_n$ $$W_n = W_1 2^{(-n+1)},$$

where $W_1$ is the width of the top level tile, and n is the tile level for associating the newly created graphic object. Here, the n is calculated as the largest positive integer such that the square tile of width W is sufficient for accommodating a substantive portion of the newly created graphic object, e.g., the radius R of the bounding circle of the newly created graphic object being larger than $C_w W_n$, with the tile width weighting factor $C_w = 0.25$. As those skilled in the art appreciate, the partitioning level n increases when a small graphic object is inserted into the collaboration space.

In another embodiment, the application program 204 does not partition the collaboration space until the collaboration space is saved to the storage area 222. When the application program 204 saves the collaboration space to the storage area 222 for long-term storage or for caching, the application program 204 determines the smallest graphic object therein, and calculates the width of the smallest tile in the Quad-Tree structure as $$W = W_1 2^{(-n+1)},$$

where $W_1$ is the width of the collaboration space, and n is the level of the smallest tile. Here, the n is calculated as the largest positive integer such that the square tile of width W is sufficient for accommodating a substantive portion of the smallest graphic object, e.g., the radius R of the bounding circle of the smallest graphic object is larger than $C_w W_n$ with the tile width weighting factor $C_w = 0.25$.

Although in above embodiments, the Quad-Tree structure is built top-down, i.e., from the largest tile at the top level to the smallest tile at the bottom level, in an alternative embodiment, the Quad-Tree structure may be built bottom-up, i.e., from the smallest tile at the bottom level to the largest tile at the top level, after determining the size of the smallest tile.

In another embodiment, the application program 204 does not partition an empty collaboration space (i.e., a collaboration space having no graphic object) until a graphic object has been created therein, at which time a smallest square tile (denoted as the reference tile) that can substantially accommodate the graphic object is determined for the graphic object to associate therewith. The width $W_r$ of this tile is used as a reference tile width. When more graphic objects are created, the application program 204 may define new tiles at the same, upper or lower level of the reference tile with a width being $W_r 2^m$, where m is an integer, by comparing the radius of the bounding circle of the graphic object and the tile width as described above. Thus, in this embodiment, a Quad-Tree structure 450' may be built from a tile at an intermediate level, and may be useful for managing an "infinite" collaboration space that appears to users to be infinite in size.

In above embodiments, the tile width weighting factor $C_w$ is predefined as 0.25 such that any graphic object is associated with a tile that can fully accommodate the graphic object. In another embodiment, the tile width weighting factor $C_w$ may be a predefined factor smaller than 0.25 and greater than 0.

In yet another embodiment, the tile width weighting factor $C_w$ may be a predefined factor greater than 0.25 but generally smaller than 0.5. In this embodiment, a graphic object may be associated with a tile that can only accommodate a major portion of the graphic object.

In another embodiment, the application program 204 allows users to choose a desired tile width weighting factor $C_w$. In addition, the weighting factor $C_w$ may be specified at the tile level so that tiles at different level may have different weighting factors.

Although in above embodiments, the weighting factor $C_b$ is predefined as 2, in other embodiments, the application program 204 may use a different weighting factor $C_b$. In another embodiment, the application program 204 allows users to choose a desired weighting factor $C_b$.

In above embodiments, the collaboration space 300 is a square space. In an alternative embodiment, the collaboration space may be a rectangular space. In this embodiment, a top level square tile is defined as a square tile that accommodates the entire collaboration space.

In above embodiments, a collaboration space is partitioned into a plurality of square tiles. In another embodiment, a collaboration space is partitioned into a plurality of rectangular tiles. In this embodiment, the application program determines the tile that a graphic object is associated therewith by finding the smallest tile in the partitioned collaboration space such that an imaginary square tile of width $W_v$, where $W_v$ equals to the smaller of the length and width of the rectangular tile, can substantially accommodate the selected graphic object.

In yet another embodiment, in which the collaboration space is partitioned into rectangular tiles with a tile length-to-width ratio $R_T$, the application program first virtually stretches a graphic object by stretching its width to a width of $W_j R_T$, where $W_j$ is the width of the graphic object. The application program then determines the tile for the graphic object to associate therewith by finding the smallest tile in the partitioned collaboration space such that an imaginary square tile of width $W_k$, where $W_k$ equals to the length of the rectangular tile, can substantially accommodate the stretched imaginary object.

In above embodiments, when a user moves the viewport around the collaboration space, the application program 204 determines in real-time the tiles required for forming the display image of the viewport. The application program 204 then loads the required but not yet loaded tiles into the working area 224, and unloads or otherwise deletes the no-longer-required tiles from the working area 224.

When a user quickly moves the viewport around the collaboration space, loading and unloading tiles may cause delays in displaying the collaboration space. In an alternative embodiment, the application program 204 first renders and displays bounding boxes or regions for required tiles to be load, but not yet loaded, to give users a visual cue that some graphic objects are still loading, and replaces each bounding box by the image of the corresponding tile when the graphic objects therein have been loaded.

In another embodiment, the application program 204, after loading a tile and determines the graphic objects therein, first renders and displays bounding boxes for graphic objects to be rendered, but not yet rendered, to give users a visual cue that some graphic objects are still loading, and replaces each bounding box by the image of the corresponding graphic object when the graphic object has been rendered.

In yet another embodiment, the application program 204 also partitions the collaboration space into a plurality of sections or grids, and generates and maintains an alternative representation, such as a thumbnail, for each section. When the viewport is moved to another location of the collaboration space, the application program 204 first display the thumbnail(s) of the section(s) to be shown in the viewport, and replaces the thumbnail(s) by the display image after required tiles are loaded and the display image is generated.

In still another embodiment, a buffer is added to the viewport by expanding the viewport for a predefined percentage on each of its four sides, and the application program 204 performs a hit test between the expanded viewport and the defined zone for each tile in the Quad-Tree to determine if the tile is required to be loaded. Performance of loading and displaying graphic objects during viewport moving may then be improved with the expense of extra memory usage. In another embodiment, the application program 204 calculates a velocity vector, estimates the moving distance of the viewport, and expands the viewport towards the direction of the calculated velocity vector with a size determined based on the magnitude of the calculated velocity vector.

In another embodiment, the application program 204 partitions a collaboration space into tiles of various levels as described above, and associates each graphic object with a tile only based on the overlapping of the center of the graphic object and the tile. The graphic objects in the obtained Quad-Tree structure are therefore not sorted by size. In other words, a larger size graphic object may be associated with a smaller tile at a lower level while a smaller size graphic object may be associated with a larger tile at a higher level.

In above embodiments, the storage area 222 and the working area 204 are local to the viewport. For example, the storage area 222, the working area 204 and the viewport may be an internal hard disk, the RAM and the display of a computing device. Alternatively, the storage area 222 may be an external storage, e.g., an external hard drive, local to the computing device that comprises the working area 224 and the viewport, and connecting thereto via a suitable connection such as a USB cable. Alternatively, the storage area 222, as an external storage, may be a remote storage accessible via a network such as the Internet, a Local Area Network (LAN), a wide area network (WAN) or the like, via suitable wired and wireless networking connections.

Figure 23:
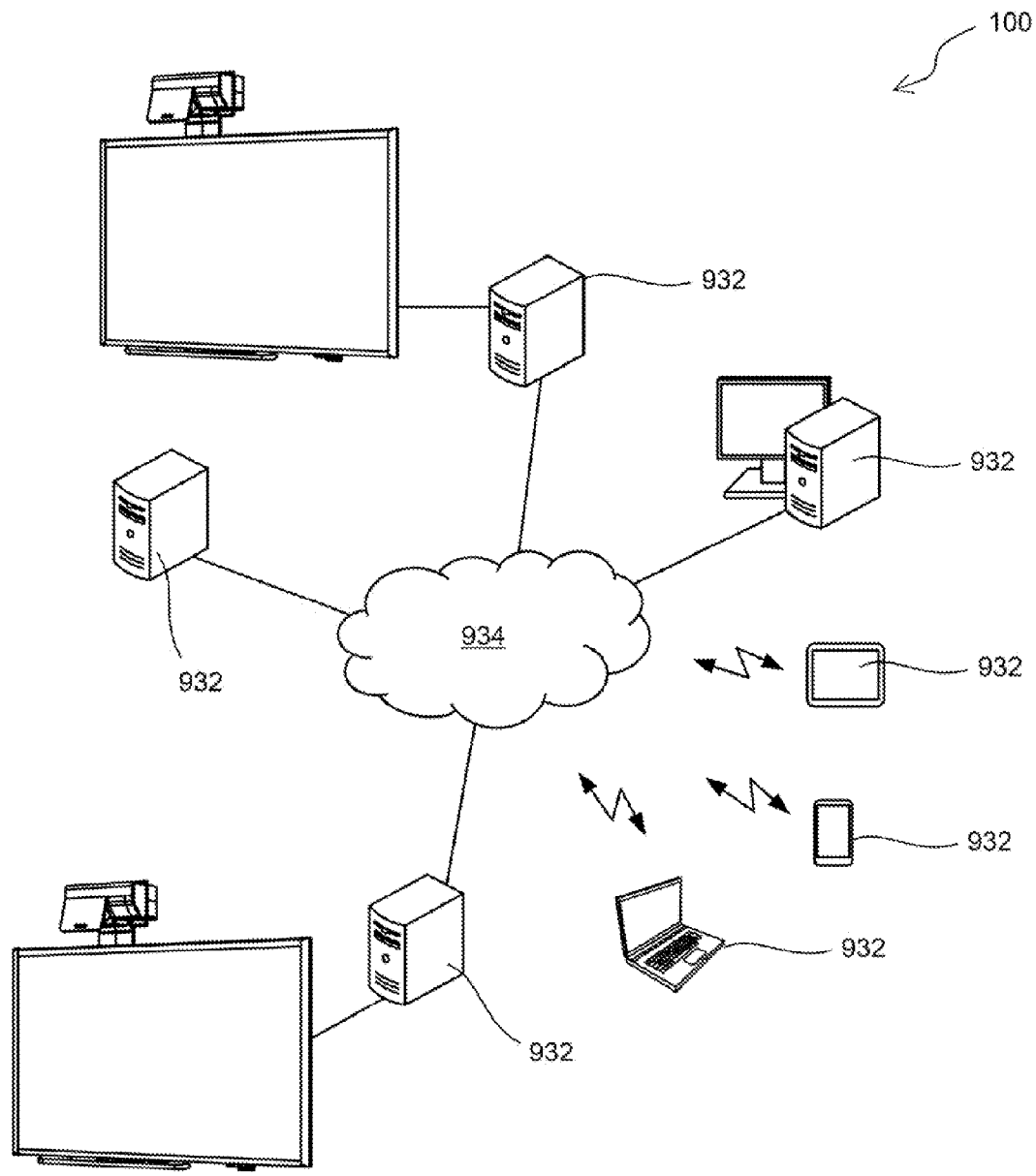
FIG. 23 is a perspective view of an example of the interactive input system, according to an alternative embodiment.

In an alternative embodiment as shown in FIG. 23, the interactive input system 100 comprises two or more computing devices 932, such as server computers, computing devices having interactive whiteboards, desktop computers, laptops, smartphones and the like, interconnected by a network 934, such as the Internet, a LAN, a WAN or the like, via suitable wired and wireless networking connections.

Depending on implementation, the server computer may be a stand-along computing device, or alternatively, a client computing device in the interactive input system may act as a server computer while also being used by a user. The server computer executes a server-side application program for managing one or more collaboration session for users of client computing devices 932 in the system. The server-side application program communicates with each computing device joined to the collaboration session, and shares content of the collaboration session therewith. A client program runs on each client computing device in the collaboration session for displaying the collaboration space or a portion thereof to the user via a viewport and for receiving user input.

During a collaboration session, the server-side application program manages one or more collaboration spaces, partitioning each collaboration space and saving the partitioned collaboration space(s) to a storage or memory functionally associated with the server computer(s), as described above. The server-side application program loads and unloads tiles as described above in response to user input received from users in the collaboration session, including user input received from an input device directly connected to the computing device running the application program (when the server computer is also used as a client computing device), and user input received from a remote client computing device via the network 934.

In this embodiment, the memory 106 of the system 100 comprises the memory or storage of all servers and client computing devices therein, and the communication channel 118 comprises the system bus in each of the servers and client computing devices in the system and the network 934 interconnecting the servers and client computing devices. The storage area 222 may be the non-volatile physical memory, e.g., hard disks, of the servers, and the working area 224 may be a portion of the RAM of a client computing device that the client program is accessing. The storage area 222 is thus remote to the working area 224. Moreover, as the view port 800 may be the display of a client computing device, the storage area 222 may be remote to the view port 800.

When a user of a client computing device moves his/her viewport, the client program sends a viewport moving command to the server side application program. The server side application program determines the required tiles to be loaded, as described above, and loads the required tiles from the storage area 222 in one or more servers to the working area 224 in the client computing device via the network 934.

In yet another embodiment, the interactive input system 100 comprises two or more computing devices 932 as shown in FIG. 23. However, in this embodiment, the storage area 222 and is the non-volatile physical memory, e.g., hard disks, of the servers, and the working area 224 is a portion of the RAM of the servers. When a user of a client computing device moves their viewport, the client program sends a viewport moving command to the server side application program. The server side application program determines the required tiles to be loaded, as described above, loads the required tiles from the storage area 222 in the one or more servers to the working area 224, generates the view port image using loaded tiles, and sends the generated view port image to client computing device via the network 934 for display.

In above embodiments, the application program is implemented as a stand-alone program executable by the operating system. In an alternative embodiment, the application program is implemented as a web-server application hosted on a server, a server farm, or a cloud service wherein a server side program module manages the collaboration space, and each one of one or more client side program modules are executed inside a respective web browser, e.g., Microsoft® Internet Explorer®, Apple® Safari®, Google Chrome™, Mozilla Firefox®, Opera™ browser, Dolphin browser, or the like, for displaying the collaboration space or a portion thereof to the user via a viewport and for receiving user input.

In above embodiments, the application program 204 first determines a tile level for a selected graphic object, and then finds a required tile in the determined tile level that overlaps with the center of the selected graphic object for associating therewith. In some alternative embodiments, the application program 204 finds a required tile by finding a tile in the determined tile level that overlaps with a substantive portion of, including the entirety of, the selected graphic object.

In above embodiments, the application program 204 stores the non-empty tiles and the empty-but-intermediate tiles empty but linking intermediate between the root node L1 and a non-empty node in the Quad-Tree structure. In an alternative embodiment, the application program 204 only stores non-empty tiles, and the linkages thereof. In an alternative embodiment, the application program 204 stores the entire Quad-Tree structure, including all empty and non-empty tiles.

In yet other embodiments, the storage area 222 may comprise RAM memory while the working area 224 may comprise cache memory having a faster access speed than the RAM used in storage area 222.

Although embodiments have been described above with reference to the accompanying drawings, those of skill in the art will appreciate that variations and modifications may be made without departing from the scope thereof as defined by the appended claims.

What is claimed is:

1. A method of controlling one or more memory devices of an interactive input system for storing a collaboration space, said collaboration space having one or more graphic objects therein, the method comprising:
    partitioning the collaboration space into a plurality of tiles distributed at a plurality of levels in a tree structure representing a recursive subdivision of the collaboration space, the union of tiles at each level spanning the collaboration space, each tile at the same level having a same size, each tile at a level either being a leaf node or being subdivided into four smaller tiles at the next level;
    determining one or more object tiles, each object tile being a tile of said plurality of tiles and associated with at least one of said one or more graphic objects; and
    controlling a first memory of said one or more memory devices to store the one or more object tiles therein, each object tile being stored in said first memory as a separate record that may be independently accessed;
    wherein the one or more object tiles are determined by:
    for each graphic object,
        determining a tile level L in the tree structure such that the size of each tile at said tile level L is larger than that of at least a predefined major portion of said graphic object;
        determining an object tile as a tile at said tile level L that overlaps with at least the predefined major portion of said graphic object; and
        associating the graphic object with the determined object tile in said tree structure.

2. The method of claim 1 wherein said object tile is the smallest tile in the tree structure that accommodates the entirety of said graphic object.

3. The method of claim 1 wherein said tile level L is determined as the tile level of the smallest tile that whose width is larger than or equal to the diameter of a bounding circle of the graphic object weighted by a first weighting factor $C_1$.

4. The method of claim 3 wherein said tiles are square tiles, and said determining a tile level L comprises:
    iterating from the level having largest tile width to the level having the smallest tile width, to determine the tile level L having the largest tile width W that satisfies $R > C_2 W$, where R is the radius of the bounding circle of the graphic object, $C_2$ is a second weighting factor, and $C_1 = 1/(4C_2)$.

5. The method of claim 4 wherein said second weighting factor $C_2$ is 0.25.

6. The method of claim 1 wherein determining the object tile as a tile in said tile level that overlaps with at least the predefined major portion of said graphic object comprises:
    determining the object tile as a tile in said tile level that overlaps with the center of a bounding circle of said graphic object.

7. The method of claim 1 further comprising:
    determining the position of a viewport, said viewport displaying a display image of at least a portion of said collaboration space;

determining a set of tiles in said tree structure required for rendering a display image to be displayed in said viewport; and loading the determined set of tiles from the first memory device to a second memory device.

8. The method of claim 7 wherein determining a set of tiles comprises:

for each tile in the tree structure:

defining a zone for said tile as an area concentric with said tile with a dimension equal to that of said tile weighted by a third weighting factor $C_3$;

determining if the view port overlaps with said zone; and marking the tile as a required tile of said set of tiles if the view port overlaps with said zone.

9. The method of claim 8 wherein said third weighting factor $C_3$ is 2.

10. An interactive input system for managing a collaboration space having one or more graphic objects, comprising:

a memory; and a processing structure functionally coupled to said memory, said processing structure executing computer-executable code stored on a non-transitory computer readable storage device for:

partitioning the collaboration space into a plurality of tiles distributed at a plurality of levels in a tree structure representing a recursive subdivision of the collaboration space, the union of tiles at each level spanning the collaboration space, each tile at the same level having a same size, each tile at a level either being a leaf node or being subdivided into four smaller tiles at the next level;

determining one or more object tiles, each object tile being a tile of said plurality of tiles and associated with at least one of said one or more graphic objects; and controlling a first memory area of said memory to store the one or more object tiles therein, each object tile being stored in said first memory area as a separate record that may be independently accessed;

wherein the one or more object tiles are determined by:

for each graphic object, determining a tile level L in the tree structure such that the size of each tile at said tile level L is larger than that of at least the predefined major portion of said graphic object;

determining an object tile as a tile at said tile level L that overlaps with at least the predefined major portion of said graphic object; and associating the graphic object with the determined object tile in said tree structure.

11. The interactive input system of claim 10 wherein said processing structure further executes computer-executable code stored on the non-transitory computer readable storage device for:

determining the position of a viewport, said viewport displaying a display image of at least a portion of said collaboration space;

determining a set of tiles in said tree structure required for rendering a display image to be displayed in said viewport; and loading the determined set of tiles from the first memory area to a second memory area.

12. The interactive input system of claim 11 wherein said computer-executable code for determining a set of tiles comprises computer-executable code for:

for each tile in the tree structure:

defining a zone for said tile as an area concentric with said tile with a dimension equal to that of said tile weighted by a weighting factor;

determining if the view port overlaps with said zone; and marking the tile as a required tile of said set of tiles if the view port overlaps with said zone.

13. A non-transitory, computer-readable storage device comprising computer-executable instructions for managing a collaboration space having one or more graphic objects, wherein the instructions, when executed by an interactive input system, cause a processor thereof to perform actions comprising:

partitioning the collaboration space into a plurality of tiles in a tree structure representing a recursive subdivision of the collaboration space, the union of tiles at each level spanning the collaboration space, each tile at the same level having a same size, each tile at a level either being a leaf node or being subdivided into four smaller tiles at the next level;

determining one or more object tiles, each object tile being a tile of said plurality of tiles and associated with at least one of said one or more graphic objects; and controlling a first memory to store at least the one or more object tiles therein, each object tile being stored in said first memory as a separate record that may be independently accessed;

wherein the one or more object tiles are determined by:

for each graphic object, determining a tile level L in the tree structure such that the size of each tile at said tile level L is larger than that of at least the predefined major portion of said graphic object;

determining an object tile as a tile at said tile level L that overlaps with at least the predefined major portion of said graphic object; and associating the graphic object with the determined object tile in said tree structure.

14. The non-transitory, computer-readable storage device of claim 13 wherein said instructions, when executed, further cause the processor to perform actions comprising:

determining the position of a viewport, said viewport displaying a display image of at least a portion of said collaboration space;

determining a set of tiles in said tree structure required for rendering a display image to be displayed in said viewport; and loading the determined set of tiles from the first memory area to a second memory area.

15. The non-transitory, computer-readable storage device of claim 14 wherein determining a set of tiles comprises:

for each tile in the tree structure:

defining a zone for said tile as an area concentric with said tile with a dimension equal to that of said tile weighted by a weighting factor;

determining if the view port overlaps with said zone; and marking the tile as a required tile of said set of tiles if the view port overlaps with said zone.

* * * * *